(12) United States Patent
Ueno et al.

(10) Patent No.: US 6,769,417 B1
(45) Date of Patent: Aug. 3, 2004

(54) APPARATUS FOR EVALUATING DETERIORATED STATE OF HYDROCARBON ADSORBENT

(75) Inventors: Masaki Ueno, Wako (JP); Hideharu Yamazaki, Wako (JP); Tetsuo Endo, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/633,570

(22) Filed: Aug. 5, 2003

(30) Foreign Application Priority Data

Aug. 5, 2002 (JP) ........................................ 2002-227182

(51) Int. Cl.[7] .............................................. F02M 33/02
(52) U.S. Cl. ..................................... 123/519; 123/520
(58) Field of Search ............................... 123/434, 519, 123/518, 520, 521, 677, 672

(56) References Cited

U.S. PATENT DOCUMENTS 6,003,498 A * 12/1999 Reddy ........................ 123/520

6,581,370 B2 * 6/2003 Ueno et al. .................... 60/277

* cited by examiner

*Primary Examiner*—Bibhu Mohanty
(74) *Attorney, Agent, or Firm*—Arent Fox PLLC

(57) ABSTRACT

After an internal combustion engine 1 has started to operate, a changing timing is detected at which a humidity represented by the output signal of a humidity sensor 23 disposed downstream of a hydrocarbon adsorbent 12 changes to a tendency to monotonously increase from a low humidity to a high humidity. Data representing a total amount of moisture carried by an exhaust gas emitted by the internal combustion engine 1 to the hydrocarbon adsorbent 12 up to the changing timing is acquired as a deterioration evaluating parameter. The deteriorated state of the hydrocarbon adsorbent is evaluated based on the deterioration evaluating parameter. The changing timing is detected as a timing at which the relative humidity represented by the output signal of the humidity sensor 23 has changed from a low humidity to a high humidity by a preset value. The preset value is variably set in order to compensate for characteristic changes of the humidity sensor 23 and variations of individual humidity sensors. The deteriorated state of the hydrocarbon adsorbent can thus adequately be monitored while compensating for the characteristic changes of the humidity sensor and the variations of individual humidity sensors.

14 Claims, 11 Drawing Sheets

APPARATUS FOR EVALUATING DETERIORATED STATE OF HYDROCARBON ADSORBENT

BACKGROUND OF THE INVENTION

1. Field of the Invention

The present invention relates to an apparatus for evaluating the deteriorated state of a hydrocarbon adsorbent that is disposed in the exhaust passage of an internal combustion engine.

2. Description of the Related Art

Some known systems for purifying exhaust gases emitted from internal combustion engines have an exhaust gas purifier disposed in the exhaust passage, which may comprise a hydrocarbon adsorbent such as zeolite or a hydrocarbon adsorbing catalyst comprising a composite combination of a hydrocarbon adsorbent and a three-way catalyst, for adsorbing hydrocarbons (HC) in the exhaust gas while the catalytic converter such as a three-way catalyst or the like is not functioning sufficiently, i.e., while the catalytic converter is not sufficiently activated as when the internal combustion engine starts to operate at a low temperature. The hydrocarbon adsorbent has a function to adsorb hydrocarbons in the exhaust gas at relatively low temperatures below 100° C., for example, and operates to release the adsorbed hydrocarbons when heated to a certain temperature in the range from 100 to 250° C., for example.

It has been desired in the art to evaluate the deteriorated state of a hydrocarbon adsorbent incorporated in an exhaust gas purifier in order to determine when to replace the exhaust gas purifier. The applicant of the present application has proposed the following technique of evaluating the deteriorated state of a hydrocarbon adsorbent: The hydrocarbon adsorbent is capable of adsorbing not only hydrocarbons contained in exhaust gases, but also moisture contained in exhaust gases. The ability of the hydrocarbon adsorbent to adsorb moisture, i.e., the maximum amount of moisture that can be adsorbed by the hydrocarbon adsorbent, is highly correlated to the ability of the hydrocarbon adsorbent to adsorb hydrocarbons, i.e., the maximum amount of hydrocarbons that can be adsorbed by the hydrocarbon adsorbent. As the hydrocarbon adsorbent progressively deteriorates, both the ability to adsorb moisture and the ability to adsorb hydrocarbons are progressively lowered in the same manner. Therefore, when the ability of the hydrocarbon adsorbent to adsorb moisture is evaluated, the ability of the hydrocarbon adsorbent to adsorb hydrocarbons can also be evaluated based on the evaluated ability to adsorb moisture. According to the technique proposed by the applicant, a humidity sensor is disposed downstream of the hydrocarbon adsorbent or humidity sensors are disposed respectively downstream and upstream of the hydrocarbon adsorbent. The deteriorated state of the hydrocarbon adsorbent is evaluated based on the transition of an output signal from the humidity sensor or sensors after the internal combustion engine has started to operate.

For adequately evaluating the deteriorated state of the hydrocarbon adsorbent using output data from the humidity sensor or sensors in various many environments that the internal combustion engine is subject to while in operation, the humidity sensor or sensors that are exposed to high-temperature exhaust gases are required to be highly durable over a long period of time, and also required to have minimum changes in the aging characteristics thereof and to suffer minimum characteristic variations among individual units of humidity sensors.

However, it is generally difficult for humidity sensors to fully satisfy all the above requirements. It would need a large expenditure of money and labor to develop humidity sensors that fully satisfy all the above requirements, and such humidity sensors would be highly expensive to manufacture.

SUMMARY OF THE INVENTION

It is therefore an object of the present invention to provide an apparatus for adequately evaluating the deteriorated state of a hydrocarbon adsorbent by compensating for changes in the characteristics of humidity sensors that are used and also compensating for characteristic variations among individual units of the humidity sensors.

Basic principles of the present invention will first be described below. The humidity which is present downstream of a hydrocarbon adsorbent disposed in an exhaust passage of an internal combustion engine after the internal combustion engine has started to operate, generally undergoes the following transition: Immediately after the internal combustion engine has started to operate, the humidity which is present downstream of the hydrocarbon adsorbent is of a relatively low level as moisture contained in the exhaust gas is adsorbed by the hydrocarbon adsorbent. When the adsorption of moisture in the exhaust gas by the hydrocarbon adsorbent is saturated, the humidity which is present downstream of the hydrocarbon adsorbent changes to a tendency to monotonously increase from a low humidity to a high humidity and is eventually converged to a substantially constant high humidity level. Therefore, a changing timing at which the humidity downstream of the hydrocarbon adsorbent changes to a tendency to monotonously increase from a low humidity to a high humidity after the internal combustion engine has started to operate corresponds to a timing at which the adsorption of moisture by the hydrocarbon adsorbent is saturated. Consequently, a total amount of moisture supplied to the hydrocarbon adsorbent up to the changing timing after the internal combustion engine has started to operate signifies a maximum quantity of moisture that can be adsorbed by the hydrocarbon adsorbent. Accordingly, if the total amount of moisture or a quantity corresponding thereto is recognized, then it is possible to evaluate the ability of the hydrocarbon adsorbent to adsorb moisture and hence the deteriorated state of the hydrocarbon adsorbent.

For evaluating the deteriorated state of the hydrocarbon adsorbent, it is necessary to detect the changing timing. The changing timing can be recognized based on an appropriate characteristic quantity representing a change in an output signal of a humidity sensor that is disposed downstream of the hydrocarbon adsorbent. For example, after the internal combustion engine has started to operate, the time when a change in the output signal of the humidity sensor from a low humidity level to a high humidity level exceeds a preset value can be detected as the changing timing. However, the transition of the output signal of the humidity sensor is affected by not only the deteriorated state of the hydrocarbon adsorbent, but also a characteristic change of the humidity sensor due to a deterioration thereof. As the humidity sensor is progressively deteriorated, the rate of change of the output signal of the humidity sensor is lowered when the humidity represented by the output signal of the humidity sensor changes to the tendency to monotonously increase. Therefore, providing the preset value for detecting the changing timing is constant, then the detected changing timing varies depending on the deteriorated state of the humidity sensor even if the deteriorated state of the hydrocarbon adsorbent remains constant, and hence the total quantity of moisture supplied to the hydrocarbon adsorbent up to the detected changing timing changes. Therefore, it is preferable to correct the preset value for detecting the changing timing depending on the characteristic change of the humidity sensor due to its deterioration, thereby compensating for the characteristic change of the humidity sensor.

According to a first aspect of the present invention, there is provided an apparatus for evaluating a deteriorated state of a hydrocarbon adsorbent disposed in an exhaust passage of an internal combustion engine for adsorbing hydrocarbons contained in an exhaust gas emitted from the internal combustion engine, based on the transition characteristics of an output signal of a humidity sensor which is disposed in the exhaust passage downstream of the hydrocarbon adsorbent after the internal combustion engine has started to operate, the apparatus comprising changing timing detecting means for detecting a changing timing at which a humidity represented by the output signal of the humidity sensor changes to a tendency to monotonously increase from a low humidity to a high humidity based on a comparison between a characteristic quantity of a change in the output signal of the humidity sensor and a preset value, after the internal combustion engine has started to operate, evaluating parameter acquiring means for acquiring data representing a total amount of moisture carried by the exhaust gas to the hydrocarbon adsorbent up to the changing timing after the internal combustion engine has started to operate, as a deterioration evaluating parameter for evaluating the deteriorated state of the hydrocarbon adsorbent, characteristic change detecting means for detecting a characteristic change of the humidity sensor based on the output signal of the humidity sensor under a predetermined condition, and characteristic change compensating means for correcting the preset value to detect the changing timing based on the characteristic change detected by the characteristic change detecting means.

In the first aspect of the present invention, the preset value for detecting the changing timing is corrected based on the characteristic change of the humidity sensor detected based on the output signal of the humidity sensor under the predetermined condition, e.g., a condition with respect to the timing to acquire the output signal of the humidity sensor, an operating condition of the internal combustion engine, etc. Thus, it is possible to appropriately detect the changing timing irrespective of the characteristic change of the humidity sensor. The data representing the total amount of moisture supplied to the hydrocarbon adsorbent up to the changing timing is acquired as the deterioration evaluating parameter for evaluating the hydrocarbon adsorbent. The deterioration evaluating parameter thus acquired corresponds to the total amount of moisture that can be adsorbed by the hydrocarbon adsorbent, and represents the deteriorated state (extent of deterioration) of the hydrocarbon adsorbent. Regardless of the characteristic change of the humidity sensor, the hydrocarbon adsorbent is more deteriorated as the value of the deterioration evaluating parameter is smaller. Thus, the deteriorated state of the hydrocarbon adsorbent can adequately be evaluated based on the value of the deterioration evaluating parameter. Since the characteristic change of the humidity sensor can thus be compensated for, requirements for the steadiness of the characteristics of the humidity sensor are made less stringent, allowing the cost required to develop the humidity sensor and the cost required to manufacture the humidity sensor to be reduced.

In the first aspect of the present invention, the characteristic change of the humidity sensor detected by the characteristic change detecting means represents, for example, a characteristic change of a brand-new humidity sensor from predetermined reference characteristics.

In the first aspect of the present invention, the characteristic quantity to be compared with the preset value may comprise a change in the output signal of the humidity sensor from a certain level to a high humidity level at the time the internal combustion engine starts operating, or a rate of change of the output signal of the humidity sensor, i.e., a change in the output signal of the humidity sensor per given time. Generally, however, the output signal of the humidity sensor prior to the changing timing suffers a slight variation due to a disturbance or the like. Therefore, it is preferable to eliminate such a variation in the output signal of the humidity sensor prior to the changing timing for the purpose of preventing the changing timing from being detected in error.

In the first aspect of the present invention, the changing timing detecting means should preferably comprise means for sequentially retrieving states in which the humidity represented by the output signal of the humidity sensor takes a minimum value, after the internal combustion engine has started to operate, and detecting the changing timing when a change in the output signal of the humidity sensor from the latest minimum value in the retrieved states to the high humidity, serving as the characteristic quantity, exceeds the preset value.

With the above arrangement, even if the output signal of the humidity sensor varies due to a disturbance or the like prior to the changing timing, it is possible to appropriately detect the changing timing at which the humidity represented by the output signal of the humidity sensor changes to the tendency to monotonously increase to the high humidity.

In the first aspect of the present invention, the characteristic change detecting means should preferably comprise means for determining a change, from a predetermined reference value, of the output signal of the humidity sensor which is of a substantially constant high humidity level, as characteristic change detecting data representative of the characteristic change of the humidity sensor, after the changing timing is detected by the changing timing detecting means, and detecting the characteristic change of the humidity sensor based on the characteristic change detecting data.

Specifically, as will be described in greater detail later on, when the adsorption of moisture by the hydrocarbon adsorbent is saturated, the humidity downstream of the hydrocarbon adsorbent monotonously increases from a low humidity to a high humidity and thereafter converges to a substantially constant high humidity, which is inherent in the exhaust gas. While the humidity at the location of the humidity sensor is being substantially constant, the level of the output signal of the humidity sensor changes as the humidity sensor is progressively deteriorated. According to the present invention, after the changing timing is detected by the changing timing detecting means, a change, from a predetermined reference value, of the output signal of the humidity sensor which is of a substantially constant high humidity level is determined as characteristic change detecting data representative of the characteristic change of the humidity sensor. Then, the characteristic change of the humidity sensor is detected based on the characteristic change detecting data. In this manner, the characteristic change of the humidity sensor can appropriately be detected. The reference value may be the value of an output signal which is generated by a brand-new humidity sensor at the above constant humidity. If the characteristic change detecting data is used to detect the characteristic change of the humidity sensor, since the characteristic change detecting data is determined after the changing timing is detected, the preset value is corrected based on the characteristic change of the humidity sensor that is detected based on the characteristic change detecting data when the internal combustion engine is operated next time or more subsequently.

In the first aspect of the present invention, the apparatus should preferably further comprise characteristic data holding means associated with the humidity sensor for holding, in advance, data with respect to characteristics of each individual unit of the humidity sensor, and the characteristic change detecting means comprises means for detecting the characteristic change of the humidity sensor based on the output signal of the humidity sensor under the predetermined condition and the data held by the characteristic data holding means.

With the above arrangement, since the characteristic change of the humidity sensor is detected using the data held by the characteristic data holding means associated with the humidity sensor, i.e., the data with respect to characteristics of each individual unit of the humidity sensor, when the preset value for detecting the changing timing is corrected, not only characteristic changes of the humidity sensor, but also characteristic variations among individual units of the humidity sensor can be compensated for. As a result, requirements for the steadiness of the characteristics of individual sensors are made less stringent, and hence the cost required to develop the humidity sensor and the cost required to manufacture the humidity sensor are reduced.

As described above, if a change from the reference value of the output signal of the humidity sensor which is of a substantially constant humidity level is used as the characteristic change detecting data after having detected the changing timing, then the apparatus has characteristic data holding means associated with the humidity sensor for holding, in advance, data for identifying the reference value with respect to the characteristic change detecting data as data with respect to characteristics of each individual unit of the humidity sensor, and the characteristic change detecting means comprises means for determining the characteristic change detecting data using the reference value which is identified by the data held by the characteristic data holding means.

With the above arrangement, the reference value which serves as a reference for detecting the characteristic change of the humidity sensor is adjusted to match the characteristics of each individual unit of the humidity sensor. As a consequence, the characteristic change of the humidity sensor can be detected while appropriately compensating for characteristic variations of individual units of the humidity sensor.

In the first aspect of the present invention wherein characteristic variations of individual units of the humidity sensor are compensated for, the characteristic data holding means should preferably comprise a resistive element having a resistance depending on the data with respect to characteristics of each individual unit of the humidity sensor.

The characteristic data holding means which comprises a resistive element can be manufactured inexpensively and have a simple structure. Inasmuch as the resistance of the resistive element can be detected relatively easily, the data with respect to the characteristics of each individual unit of the humidity sensor can easily be recognized. The characteristic data holding means should preferably be provided on a connector by which the humidity sensor is connected to an electronic circuit unit, for example, for processing the output signal of the humidity sensor.

In the first aspect of the present invention, the evaluating parameter acquiring means should preferably comprise means for generating integrated moisture quantity data representative of sequentially integrated data of a quantity of moisture contained in the exhaust gas emitted from the internal combustion engine from the start of operation of the internal combustion engine, and means for acquiring the integrated moisture quantity data at the changing timing as the deterioration evaluating parameter.

Specifically, the integrated moisture quantity data at the changing timing represents a total quantity of moisture that is supplied to the hydrocarbon adsorbent until the adsorption of moisture by the hydrocarbon adsorbent is saturated after the internal combustion engine has started to operate. Therefore, the integrated moisture quantity data at the changing timing can be obtained as an appropriate deterioration evaluating parameter representative of the ability of the hydrocarbon adsorbent to adsorb moisture and hence the ability of the hydrocarbon adsorbent to adsorb hydrocarbons.

While the internal combustion engine is being shut off, the hydrocarbon adsorbent adsorbs some moisture that is present therearound. Therefore, when the internal combustion engine starts to operate, the humidity in the vicinity of the hydrocarbon adsorbent, including a region upstream thereof, is relatively low. Even after the internal combustion engine has started to operate, there is a short time delay until the exhaust gas generated by the internal combustion engine, i.e., the exhaust gas that is relatively highly humid, reaches a position near the inlet of the hydrocarbon adsorbent. Consequently, the humidity upstream of the hydrocarbon adsorbent is low for a relatively short period of time immediately after the internal combustion engine has started to operate. Thereafter, when the highly humid exhaust gas reaches the position near the inlet of the hydrocarbon adsorbent, the humidity upstream of the hydrocarbon adsorbent exhibits a tendency to monotonously increase from a low humidity to a high humidity, and then converges to a substantially constant high humidity level. The timing at which the humidity upstream of the hydrocarbon adsorbent changes from a low humidity to a high humidity may vary depending on the structure of the exhaust system of the internal combustion engine and the absorption of moisture by a catalytic converter that is disposed upstream of the hydrocarbon adsorbent. In this case, the timing at which the hydrocarbon adsorbent essentially starts adsorbing moisture in the exhaust gas in the exhaust gas tends to vary. For more adequately evaluating the deteriorated state of the hydrocarbon adsorbent, i.e., its ability to adsorb hydrocarbons and moisture, it is preferable that the changing timing at which the humidity upstream of the hydrocarbon adsorbent exhibits a tendency to monotonously increase from a low humidity to a high humidity be detected using a humidity sensor disposed upstream of the hydrocarbon adsorbent, and data representative of a total quantity of moisture that is supplied to the hydrocarbon adsorbent from the changing timing of the output signal from the upstream humidity sensor to the changing timing of the output signal from the downstream humidity sensor be acquired as a deterioration evaluating parameter. If the humidity sensor is provided not only downstream of the hydrocarbon adsorbent but also upstream of the hydrocarbon adsorbent, then it is preferable to compensate for both characteristic changes of the downstream humidity sensor and characteristic changes of the upstream humidity sensor.

According to a second aspect of the present invention, there is provided an apparatus for evaluating a deteriorated state of a hydrocarbon adsorbent disposed in an exhaust passage of an internal combustion engine for adsorbing hydrocarbons contained in an exhaust gas emitted from the internal combustion engine, based on the transition characteristics of output signals of upstream and downstream humidity sensors which are disposed in the exhaust passage respectively upstream and downstream of the hydrocarbon adsorbent after the internal combustion engine has started to operate, the apparatus comprising upstream changing timing detecting means for detecting a changing timing at which a humidity represented by the output signal of the upstream humidity sensor changes to a tendency to monotonously increase from a low humidity to a high humidity based on a comparison between a characteristic quantity of a change in the output signal of the upstream humidity sensor and a first preset value, after the internal combustion engine has started to operate, downstream changing timing detecting means for detecting a changing timing at which a humidity represented by the output signal of the downstream humidity sensor changes to a tendency to monotonously increase from a low humidity to a high humidity based on a comparison between a characteristic quantity of a change in the output signal of the downstream humidity sensor and a second preset value, evaluating parameter acquiring means for acquiring data representing a total amount of moisture carried by the exhaust gas to the hydrocarbon adsorbent from the upstream changing timing to the downstream changing timing, as a deterioration evaluating parameter for evaluating the deteriorated state of the hydrocarbon adsorbent, characteristic change detecting means for detecting a characteristic change of each of the humidity sensors based on the output signals of the humidity sensors under a predetermined condition, and characteristic change compensating means for correcting the first preset value and the second preset value based on the characteristic changes of the upstream humidity sensor and the downstream humidity sensor detected by the characteristic change detecting means.

In the second aspect of the present invention, the second preset value for detecting the changing timing with respect to the downstream humidity sensor is corrected based on the detected characteristic change of the downstream humidity sensor as with the first aspect of the present invention. The first preset value for detecting the changing timing with respect to the upstream humidity sensor is corrected based on the detected characteristic change of the upstream humidity sensor in the same manner as the second preset value with respect to the downstream humidity sensor. Therefore, the changing timings with respect to the upstream and downstream humidity sensors can appropriately be detected irrespective of the characteristic changes of those humidity sensors. The data representing the total amount of moisture supplied to the hydrocarbon adsorbent from the upstream changing timing to the downstream changing timing is acquired as the deterioration evaluating parameter, and the deterioration evaluating parameter thus acquired corresponds to the total quantity of moisture that can be adsorbed by the hydrocarbon adsorbent independently of characteristic changes of the humidity sensors and variations of the changing timing of the upstream humidity, and thus represents the deteriorated state (extent of deterioration) of the hydrocarbon adsorbent. Specifically, as the value of the deterioration evaluation parameter is smaller, the hydrocarbon adsorbent is more deteriorated independently of characteristic changes of the humidity sensors and variations of the changing timing of the upstream humidity. The deteriorated state of the hydrocarbon adsorbent can be evaluated more adequately based on the value of the deterioration evaluating parameter. Because the characteristic changes of both the humidity sensors can be compensated for, requirements for the steadiness of the characteristics of the humidity sensors are made less stringent, allowing the humidity sensors to have some characteristic changes. Consequently, the cost required to develop the humidity sensor and the cost required to manufacture the humidity sensor can be reduced.

In the second aspect of the present invention, the characteristic quantities with respect to both the upstream and downstream humidity sensors should preferably be the same as the characteristic quantity in the first aspect of the present invention. Specifically, the upstream changing timing detecting means should preferably comprise means for sequentially retrieving states in which the humidity represented by the output signal of the upstream humidity sensor takes a minimum value, after the internal combustion engine has started to operate, and detecting the changing timing with respect to the upstream humidity sensor when a change in the output signal of the upstream humidity sensor from the latest minimum value in the retrieved states to the high humidity, serving as the characteristic quantity with respect to the upstream humidity sensor, exceeds the first preset value. Similarly, the downstream changing timing detecting means should preferably comprise means for sequentially retrieving states in which the humidity represented by the output signal of the downstream humidity sensor takes a minimum value, after the internal combustion engine has started to operate, and detecting the changing timing with respect to the downstream humidity sensor when a change in the output signal of the downstream humidity sensor from the latest minimum value in the retrieved states to the high humidity, serving as the characteristic quantity with respect to the downstream humidity sensor, exceeds the second preset value.

With the above arrangement, the changing timings of the humidities detected by the upstream and downstream humidity sensors can adequately be detected even if the output signals of the humidity sensors are varied due to a disturbance or the like prior to the respective changing timings.

In the second aspect of the present invention, the characteristic change detecting means should preferably comprise means for determining a change, from a predetermined reference value, of the output signal of the upstream humidity sensor which is of a substantially constant high humidity level, as characteristic change detecting data representative of the characteristic change of the upstream humidity sensor, after the changing timing is detected by the upstream changing timing detecting means, determining a change, from a predetermined reference value, of the output signal of the downstream humidity sensor which is of a substantially constant high humidity level, as characteristic change detecting data representative of the characteristic change of the downstream humidity sensor, after the changing timing is detected by the downstream changing timing detecting means, and detecting the characteristic change of each of the humidity sensors based on the characteristic change detecting data with respect to each of the humidity sensors.

As described above in the first aspect of the present invention, the humidity at the location of the downstream humidity sensor finally converges to a substantially constant high humidity level after the changing timing of the downstream humidity, and the level of the output signal of the downstream humidity sensor at the substantially constant high humidity level changes as the downstream humidity sensor is progressively deteriorated. This also holds true for the upstream humidity sensor. Consequently, the characteristic change detecting data with respect to the humidity sensors are determined in the same manner as with the first aspect of the present invention, and the characteristic changes of the humidity sensors are detected based on the determined characteristic change detecting data with respect to the humidity sensors, so that the characteristic changes can appropriately be detected with respect to the respective humidity sensors.

The reference value with respect to each of the humidity sensors may be the value of an output signal which is generated by a brand-new humidity sensor at the above constant humidity. If the characteristic change detecting data is used to detect the characteristic change of each of the humidity sensors, since the characteristic change detecting data for each of the humidity sensors is determined after the changing timing with respect to each of the humidity sensors is detected, the first and second preset values are corrected based on the characteristic changes of the humidity sensors that are detected based on the characteristic change detecting data when the internal combustion engine is operated next time or more subsequently.

In the second aspect of the present invention, the apparatus should preferably further comprise characteristic data holding means associated respectively with the upstream and downstream humidity sensors, for holding, in advance, data with respect to characteristics of each individual unit of the upstream and downstream humidity sensors, and the characteristic change detecting means comprises means for detecting the characteristic changes of upstream and downstream humidity sensors based on the output signals of the upstream and downstream humidity sensors under the predetermined condition and the data held by the characteristic data holding means.

With the above arrangement, since the characteristic changes of the humidity sensors are detected using the data held by the characteristic data holding means associated respectively with the upstream and downstream humidity sensors, i.e., the data relative to the characteristics of the individual units of the upstream and downstream humidity sensors, when the first and second preset values for detecting the upstream and downstream changing timings are corrected, it is possible to compensate for not only characteristic changes of the humidity sensors, but also characteristic variations among individual units of the humidity sensors. As a result, requirements for the steadiness of the characteristics of individual sensors are made less stringent, and hence the cost required to develop the humidity sensors and the cost required to manufacture the humidity sensors are reduced.

For detecting the characteristic changes of the humidity sensors using the characteristic change detecting data, the apparatus should preferably further comprise characteristic data holding means associated respectively with the humidity sensors, for holding, in advance, data for identifying the reference values with respect to the characteristic change detecting data with respect to the respective humidity sensors as data with respect to characteristics of each individual unit of the humidity sensors, and the characteristic change detecting means comprises means for determining the characteristic change detecting data with respect to the respective humidity sensors using the reference values which are identified by the data held by the characteristic data holding means of the respective humidity sensors.

With the above arrangement, the reference values which serve as a reference for detecting the characteristic changes of the humidity sensors are adjusted to match the characteristics of individual units of the humidity sensors. As a consequence, the characteristic changes of the humidity sensors can be detected while appropriately compensating for characteristic variations of individual units of the upstream and downstream humidity sensors.

In the second aspect of the present invention wherein characteristic variations of individual units of the upstream and downstream humidity sensors are compensated for, as with the first aspect of the present invention, the characteristic data holding means should preferably comprise respective resistive elements having respective resistances depending on the data with respect to characteristics of individual units of the humidity sensors. The characteristic data holding means which comprise resistive elements can be manufactured inexpensively and have a simple structure. Inasmuch as the resistances of the resistive elements can be detected relatively easily, the data with respect to the characteristics of individual units of the humidity sensors can easily be recognized.

In the second aspect of the present invention, the evaluating parameter acquiring means should preferably comprise means for generating integrated moisture quantity data representative of sequentially integrated data of a quantity of moisture contained in the exhaust gas emitted from the internal combustion engine from the start of operation of the internal combustion engine, and means for acquiring the difference between the integrated moisture quantity data at the changing timing with respect to the downstream humidity sensor and the integrated moisture quantity data at the changing timing with respect to the upstream humidity sensor, as the deterioration evaluating parameter.

Specifically, the difference between the integrated moisture quantity data at the downstream changing timing and the integrated moisture quantity data at the upstream changing timing represents a total quantity of moisture that is supplied to the hydrocarbon adsorbent from the upstream changing timing to the downstream changing timing. Therefore, the difference obtained as the deterioration evaluating parameter is appropriate as representing the ability of the hydrocarbon adsorbent to adsorb moisture and hence the ability of the hydrocarbon adsorbent to adsorb hydrocarbons regardless variations of the upstream changing timing.

In either the first aspect or the second aspect of the present invention, the integrated moisture quantity data may be the data of an integrated moisture quantity itself, but may basically be any data insofar as it is substantially proportional to the integrated moisture quantity. For example, an integrated value of a quantity of fuel supplied to the internal combustion engine or an integrated value of a quantity of air drawn into the internal combustion engine may be used as the integrated moisture quantity data. If the internal combustion engine operates in a substantially constant mode such as an idling mode after it has started operating, then a period of time that has elapsed after the internal combustion engine has started operating may be used as the integrated moisture quantity data.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
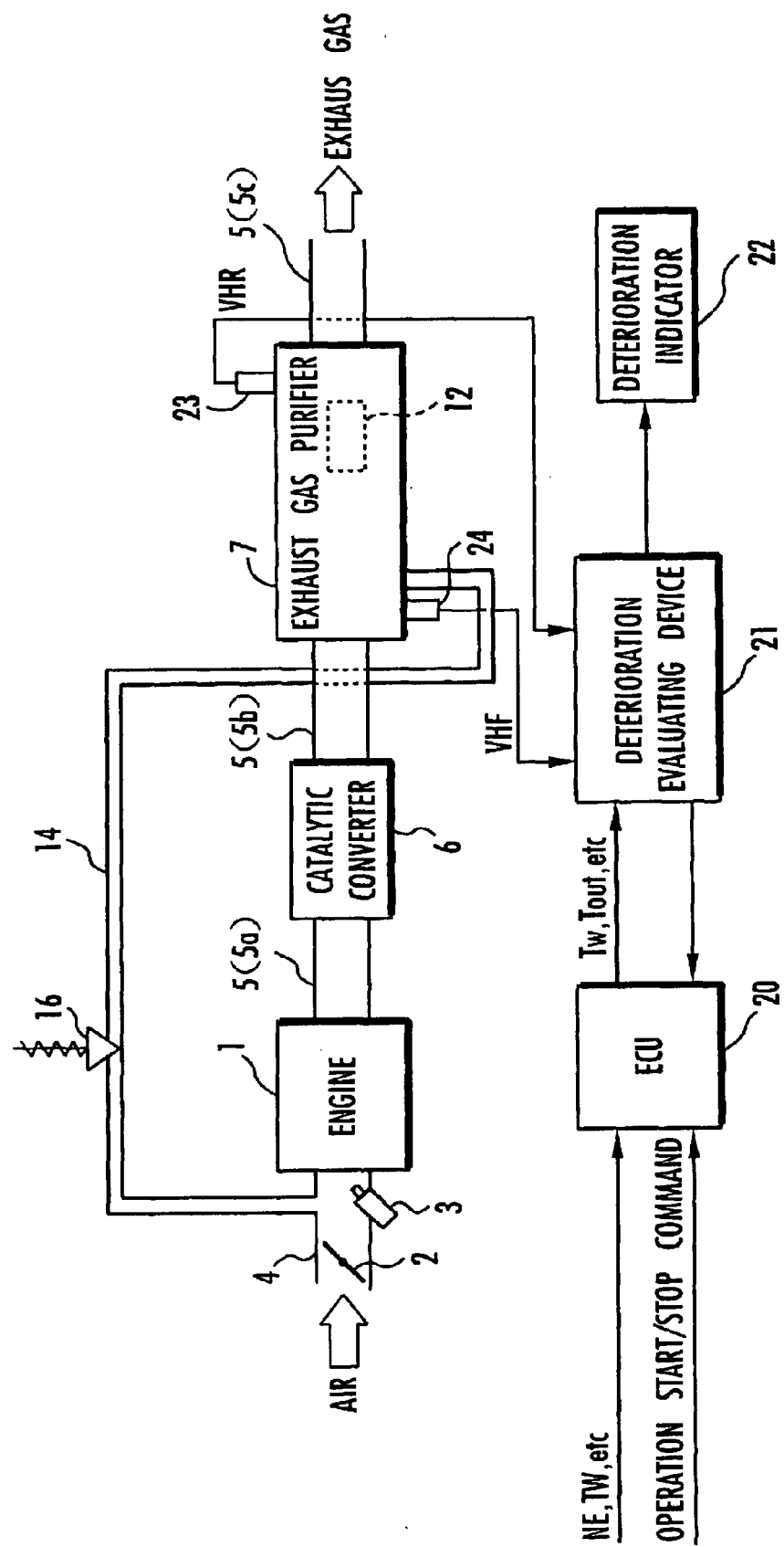
FIG. 1 is a block diagram of an apparatus for evaluating the deteriorated state of a hydrocarbon adsorbent according to a first embodiment of the present invention.

An apparatus for evaluating the deteriorated state of a hydrocarbon adsorbent according to a first embodiment of the present invention will first be described below with reference to FIGS. 1 through 10. FIG. 1 shows in block form the apparatus according to the first embodiment of the present invention. An internal combustion engine 1 is mounted as a propulsion source on an automobile or a hybrid vehicle, for example. When a mixture of fuel and air is drawn from an intake pipe (intake passage) 4 having a throttle valve 2 and a fuel injector 3 and combusted in each cylinder of the internal combustion engine 1, an exhaust gas is generated and emitted from each cylinder into an exhaust pipe (exhaust passage) 5. A catalytic converter 6 and an exhaust gas purifier 7 which incorporates a hydrocarbon adsorbent 12, to be described later on, are successively arranged downstream and mounted on the exhaust pipe 5 for purifying the exhaust gas emitted from the internal combustion engine 1. A portion of the exhaust pipe 5 which extends upstream of the catalytic converter 6 is referred to as a first exhaust pipe 5a. A portion of the exhaust pipe 5 which extends between the catalytic converter 6 and the exhaust gas purifier 7 is referred to as a second exhaust pipe 5b. A portion of the exhaust pipe 5 which extends downstream of the exhaust gas purifier 7 is referred to as a third exhaust pipe 5c. The third exhaust pipe 5c has a downstream end that is open into the atmosphere. If necessary, a catalytic converter which is different from the catalytic converter 6 and a muffler (silencer) may be mounted on the third exhaust pipe 5c.

The catalytic converter 6 incorporates a three-way catalyst (not shown) therein. The catalytic converter 6 purifies, by way of oxidizing and reducing reactions, gas components including nitrogen oxide (NOx), hydrocarbons (HC), carbon monoxide (CO), etc. contained in the exhaust gas emitted from the internal combustion engine 1 and supplied from the first exhaust pipe 5a into the catalytic converter 6.

Figure 2:
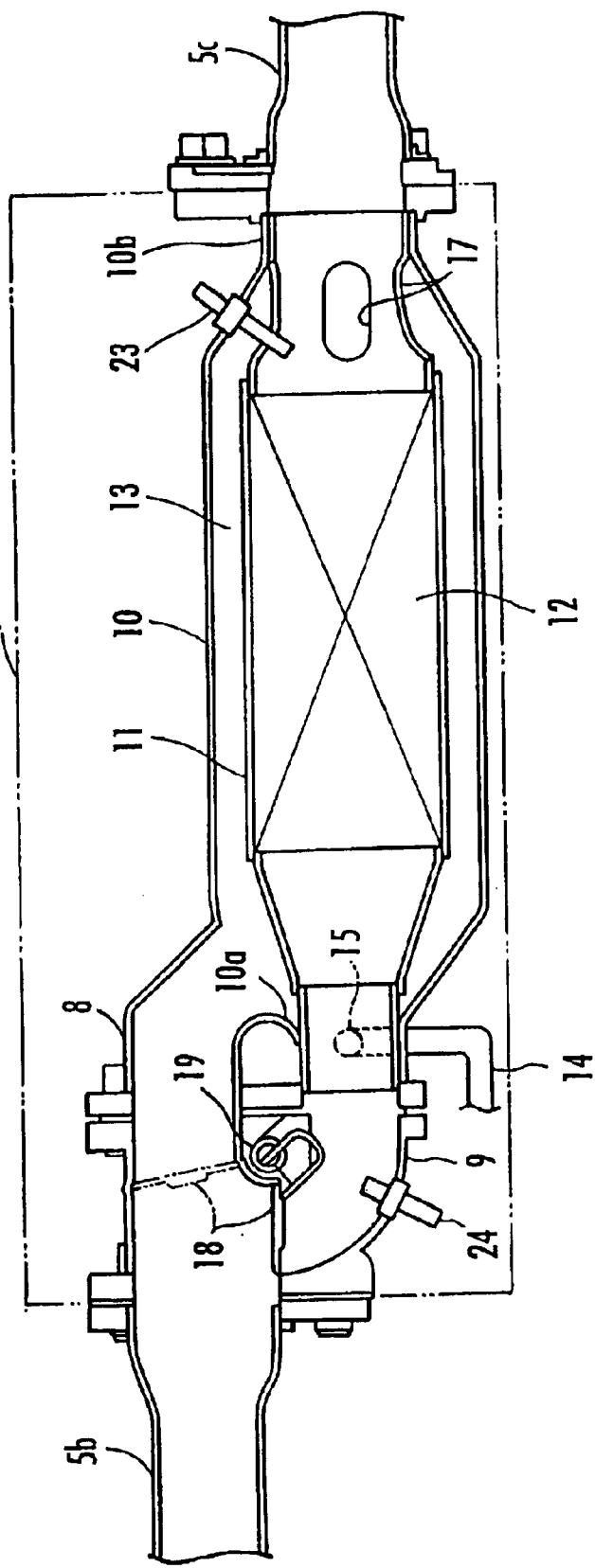
FIG. 2 is a cross-sectional view of an exhaust gas purifier in the apparatus shown in FIG. 1.

The exhaust gas purifier 7 has a structure as shown in FIG. 2. The exhaust gas purifier 7 comprises two branch passages 8, 9 branched from the downstream end of the second exhaust pipe 5b, a substantially cylindrical housing 10 connected to the downstream end of the branch passage 8, and a bypass exhaust pipe (exhaust passage) 11 disposed substantially concentrically in the housing 10. A cylindrical hydrocarbon adsorbent (hereinafter referred to as "HC adsorbent") 12 is mounted in the bypass exhaust pipe 11. The HC adsorbent 12 is made of a zeolite-based material and serves to adsorb HC contained in the exhaust gas which is emitted from the internal combustion engine 1 in an initial phase of operation of the internal combustion engine 1.

A tubular space 13 is defined between the inner circumferential surface of the housing 10 and the outer circumferential surface of the bypass exhaust pipe 11 for introducing therein the exhaust gas from the branch passage 8. The bypass exhaust pipe 11 has an upstream end (left end in FIG. 2) connected to the downstream end of the branch passage 9 through an opening 10a that is defined in an upstream end wall of the housing 10. The upstream end of the bypass exhaust pipe 11 has an outer circumferential surface closely held against the inner circumferential surface of the opening 10a in the housing 10, keeping the exhaust passage 13 in the housing 10 out of communication with the branch passage 9 through the opening 10a.

An EGR (Exhaust Gas Recirculation) passage 14 extends from the upstream end of the bypass passage 11. The EGR passage 14 communicates with the space in the bypass passage 11 through a communication hole 15 that is defined in the circumferential wall of the upstream end of the bypass passage 11. As shown in FIG. 1, the EGR passage 14 is connected to the intake pipe 4 downstream of the throttle valve 2. The EGR passage 14 serves to return the exhaust gas to the intake pipe 4 under given conditions during operation of the internal combustion engine 1 in order to combust an unburned gas in the exhaust gas. An on/off solenoid-operated valve 16 is mounted in the EGR passage 14 for selectively opening and closing the EGR passage 14.

The bypass exhaust pipe 11 has a downstream end (right end in FIG. 2) connected to the third exhaust pipe 5c through an opening 10b that is defined in a downstream end wall of the housing 10. The downstream end of the bypass exhaust pipe 11 has an outer circumferential surface closely held against the inner circumferential surface of the opening 10b in the housing 10, keeping the exhaust passage 13 in the housing 10 out of communication with the third exhaust pipe 5c through the opening 10b. The exhaust passage 13 communicates with the bypass exhaust pipe 11 through a plurality of communication holes 17 which are defined in a downstream circumferential wall of the bypass exhaust pipe 11.

The second exhaust pipe 5b and the branch passages 8, 9 are joined to each other at a junction where there is disposed a directional control valve 18 for venting one, at a time, of the branch passages 8, 9 to the second exhaust pipe 5b. The directional control valve 18 can be angularly moved about a pivot shaft 19 between a solid-line position and an imaginary-line position in FIG. 2 by an actuator (not shown). When the directional control valve 18 is actuated into the solid-line position, it shields the branch passage 9 from the second exhaust pipe 5b and vents the branch passage 8 to the second exhaust pipe 5b. Conversely, when the directional control valve 18 is actuated into the imaginary-line position, it vents the branch passage 8 to the second exhaust pipe 5b and shields the branch passage 9 to the second exhaust pipe 5b. Therefore, when the directional control valve 18 is actuated into the solid-line position, the exhaust gas supplied from the internal combustion engine 1 through the second exhaust pipe 5b to the exhaust gas purifier 7 flows through the branch passage 8, the exhaust passage 13 in the housing 10, the communication holes 17, and the third exhaust pipe 5c into the atmosphere. When the directional control valve 18 is actuated into the imaginary-line position, the exhuast gas supplied from the internal combustion engine 1 through the second exhaust pipe 5b to the exhaust gas purifier 7 flows through the branch passage 9, the bypass exhaust pipe 11 (including the HC adsorbent 12 mounted therein), and the third exhaust pipe 5c into the atmosphere.

The apparatus also has, in addition to the above mechanical structures, the following components for controlling operation of the internal combustion engine 1 and evaluating a deteriorated state of the HC adsorbent 12. Specifically, the apparatus has a controller 20 (hereinafter referred to as "ECU 20") for controlling operation of the internal combustion engine 1 (including operation of the on/off valve 16 in the EGR passage 14 and the directional control valve 18), a deterioration evaluating device 21 for executing a processing sequence to evaluate a deteriorated state of the HC adsorbent 12, a deterioration indicator 22 for indicating the deteriorated state as evaluated, and a humidity sensor 23 mounted on the exhaust gas purifier 7 for detecting the humidity (relative humidity) of the exhaust gas downstream of the HC adsorbent 12. The ECU 20 and the deterioration evaluating device 21 are implemented by a microcomputer or the like. The deterioration indicator 22 comprises a lamp, a buzzer, or a display unit for displaying characters, a graphic image, etc. Denoted by the reference numeral 24 in FIG. 1 is a humidity sensor used in a second embodiment of the present invention, which may be dispensed with the present embodiment.

Figure 3:
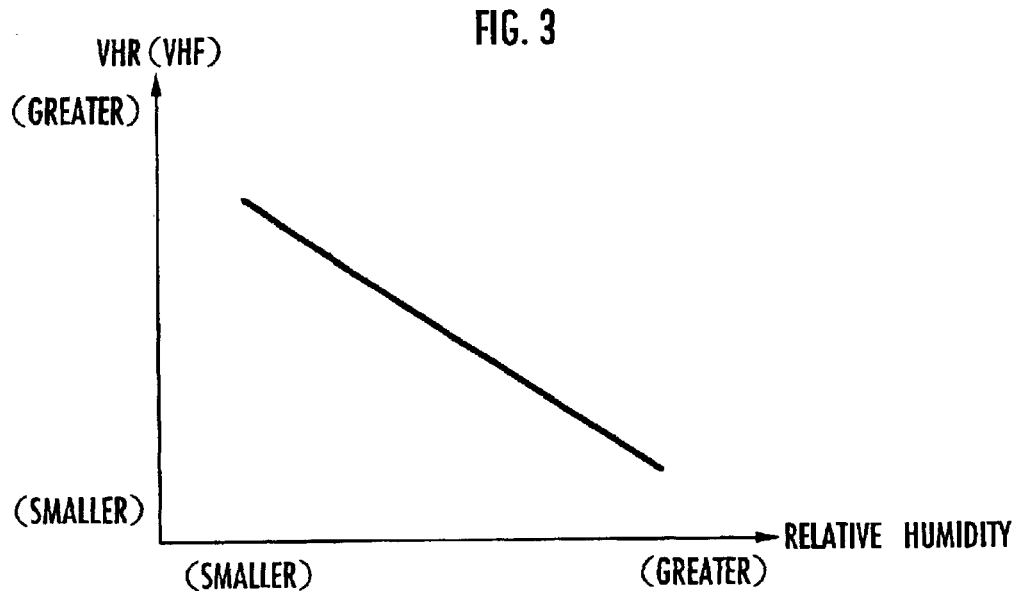
FIG. 3 is a graph showing the output characteristics of a humidity sensor in the apparatus shown in FIG. 1.

The humidity sensor 23 has a humidity sensing element (not shown) made of a porous material of alumina, titania, or the like, whose electric resistance varies depending on the humidity (relative humidity) of the exhaust gas to which the humidity sensor 23 is exposed. When the humidity sensor 23 is energized by the deterioration evaluating device 21, the humidity sensor 23 produces an output voltage VHR, which is proportional to the electric resistance of the humidity sensing element, depending on the humidity (relative humidity) of the exhaust gas, as shown in FIG. 3. The output voltage VHR of the humidity sensor 23 decreases substantially linearly as the humidity increases. Therefore, the output voltage VHR of the humidity sensor 23 has a negative humidity coefficient, i.e., it decreases as the humidity (relative humidity) of the exhaust gas increases. As shown in FIG. 2, the humidity sensor 23 is mounted on the housing 10 with its humidity sensing element (at the tip end of the humidity sensor 23) projecting into the bypass exhaust pipe 11 downstream of the HC adsorbent 12. Therefore, the humidity sensor 23 produces an output voltage VHR depending on the humidity (relative humidity) of the exhaust gas downstream of the HC adsorbent 12 in the vicinity of the HC adsorbent 12 within the bypass exhaust pipe 11. The reference characters VHF in parentheses shown in FIG. 3 refer to an output voltage used in the second embodiment of the present invention which will be described later on.

Figure 4:
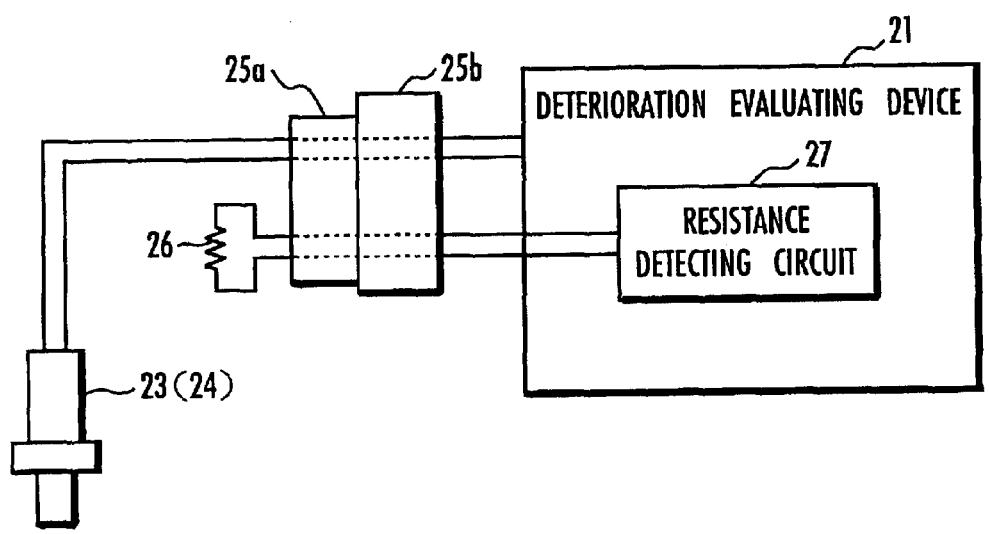
FIG. 4 is a block diagram showing an arrangement in which the humidity sensor and a deterioration evaluating device in the apparatus shown in FIG. 1 are connected to each other.

As shown in FIG. 4, the humidity sensor 23 is electrically connected to the deterioration evaluating device 21 by two connectors 25a, 25b. The connector 25a closer to the humidity sensor 23 has a resistive element 26 serving as a characteristic data holding means. The resistive element 26 has a resistance depending on the characteristics actually measured for each individual unit of the humidity sensor 23. The resistive element 26 (hereinafter referred to as "label resistive element 26") is electrically connected, together with the humidity sensor 23, to the deterioration evaluating device 21 when the connector 25a closer to the humidity sensor 23 is connected to the connector 25b closer to the deterioration evaluating device 21. The deterioration evaluating device 21 has a resistance detecting circuit 27 for detecting the resistance of the label resistive element 26, i.e., generating a voltage having a level depending on the resistance of the label resistive element 26. The deterioration evaluating device 21 recognizes the characteristics of the humidity sensor 23 that is used based on the resistance of the label resistive element 26 which is detected by the resistance detecting circuit 27, and sets a parameter, to be described in detail later on, related to the evaluation of a deteriorated state of the HC adsorbent 12. The reference numerals 24 in parentheses shown in FIG. 4 refer to a humidity sensor in the second embodiment of the present invention which will be described later on.

As shown in FIG. 1, the ECU 20 is supplied with detected data of the rotational speed NE of the internal combustion engine 1, the engine temperature TW thereof (specifically, the temperature of the coolant of the internal combustion engine 1), etc. from non-illustrated sensors, and also with an operation start command signal and an operation stop command signal for the internal combustion engine 1 from a non-illustrated operation switch. The ECU 20 then controls operation of the internal combustion engine 1 based on the detected data and the command signals that are supplied thereto, according to a predetermined control program. Specifically, the ECU 20 controls the opening of the throttle valve 2 with an actuator (not shown), controls the amount of fuel injected by the fuel injector 3, controls an igniter (not shown), controls the starting of the internal combustion engine 1 with a starter motor (not shown), controls the on/off valve 16 mounted in the EGR passage 16, and controls operation of the directional control valve 18 of the exhaust gas purifier 7.

The deterioration evaluating device 21 is supplied with the output voltage VHR from the humidity sensor 23, i.e., a signal indicative of a detected value of the relative humidity, detected data of the resistance of the label resistive element 26 which represents the characteristics of the humidity sensor 23, detected data of the engine temperature TW of the engine 1 from the ECU 20, and a fuel injection quantity command value Tout generated by the ECU 20 for controlling the amount of fuel to be injected into the internal combustion engine 1, i.e., a value which determines the amount of fuel to be injected by the fuel injector 3. The deterioration evaluating device 21 evaluates, i.e., recognizes a deteriorated state of the HC adsorbent 12 of the exhaust gas purifier 7 based on the supplied data according to a predetermined program, as described later on. The deterioration evaluating device 21 evaluates a deteriorated state of the HC adsorbent 12 as either a state where it has been deteriorated to the extent that it needs to be replaced (such a deteriorated state will hereinafter be referred to as "deterioration-in-progress state") or a state where it has not been deteriorated to the deterioration-in-progress state (such a state will hereinafter be referred to as "non-deteriorated state"). When the deterioration evaluating device 21 judges that the deteriorated state of the HC adsorbent 12 is the deterioration-in-progress state, the deterioration evaluating device 21 controls the deterioration indicator 22 to indicate the deteriorated state as thus evaluated. The deterioration evaluating device 21 functions as the changing timing detecting means, the evaluating parameter acquiring means, the characteristic change detecting means, and the characteristic change compensating means according to the first aspect of the present invention.

Operation of the apparatus according to the present embodiment, particularly for evaluating the deteriorated state of the HC adsorbent 12, will be described in detail below. When the operation switch (not shown) is turned on to start operation of the internal combustion engine 1, the ECU 20 and the deterioration evaluating device 21 are activated. The ECU 20 operates the directional control valve 18 to move to the imaginary-line position in FIG. 2 with the non-illustrated motor. The branch passage 8 is shielded from the second exhaust pipe 5b, and the branch passage 9 communicates with the second exhaust pipe 5b. The ECU 20 then starts the internal combustion engine 1 with the starter motor (not shown) to rotate the crankshaft (not shown) of the internal combustion engine 1. The ECU 20 controls the fuel injector 3 to supply the fuel to the internal combustion engine 1, and controls the igniter (not shown) to start operating the internal combustion engine 1.

When the internal combustion engine 1 starts operating, it emits an exhaust gas that is discharged through the first exhaust pipe 5a, the catalytic converter 6, the second exhaust pipe 5b, the branch passage 9, the bypass exhaust pipe 11 (including the HC adsorbent 12), and the third exhaust pipe 5c into the atmosphere. At this time, while the exhaust gas is passing through the HC adsorbent 12 in the bypass exhaust pipe 11, hydrocarbons (HCs) in the exhaust gas are adsorbed by the HC adsorbent 12. Therefore, even while the catalytic converter 6 is not sufficiently activated as when the internal combustion engine 1 starts to operate at a low temperature, the HCs are prevented from being discharged into the atmosphere. At the same time, the HC adsorbent 12 adsorbs moisture in the exhaust gas as well as the HCs in the exhaust gas. When the catalytic converter 6 is sufficiently activated by being heated by the exhaust gas, the directional control valve 18 is moved to the solid-line position in FIG. 2. Therefore, the exhaust gas emitted from the internal combustion engine 1 is normally discharged through the exhaust passage 13 in the housing 10 into the atmosphere. HCs that are released from the HC adsorbent 12 after the HC adsorbent 12 is heated by the exhaust gas flow through the EGR passage 16 into the intake pipe 4, and then combusted in the internal combustion engine 1.

Figure 6:
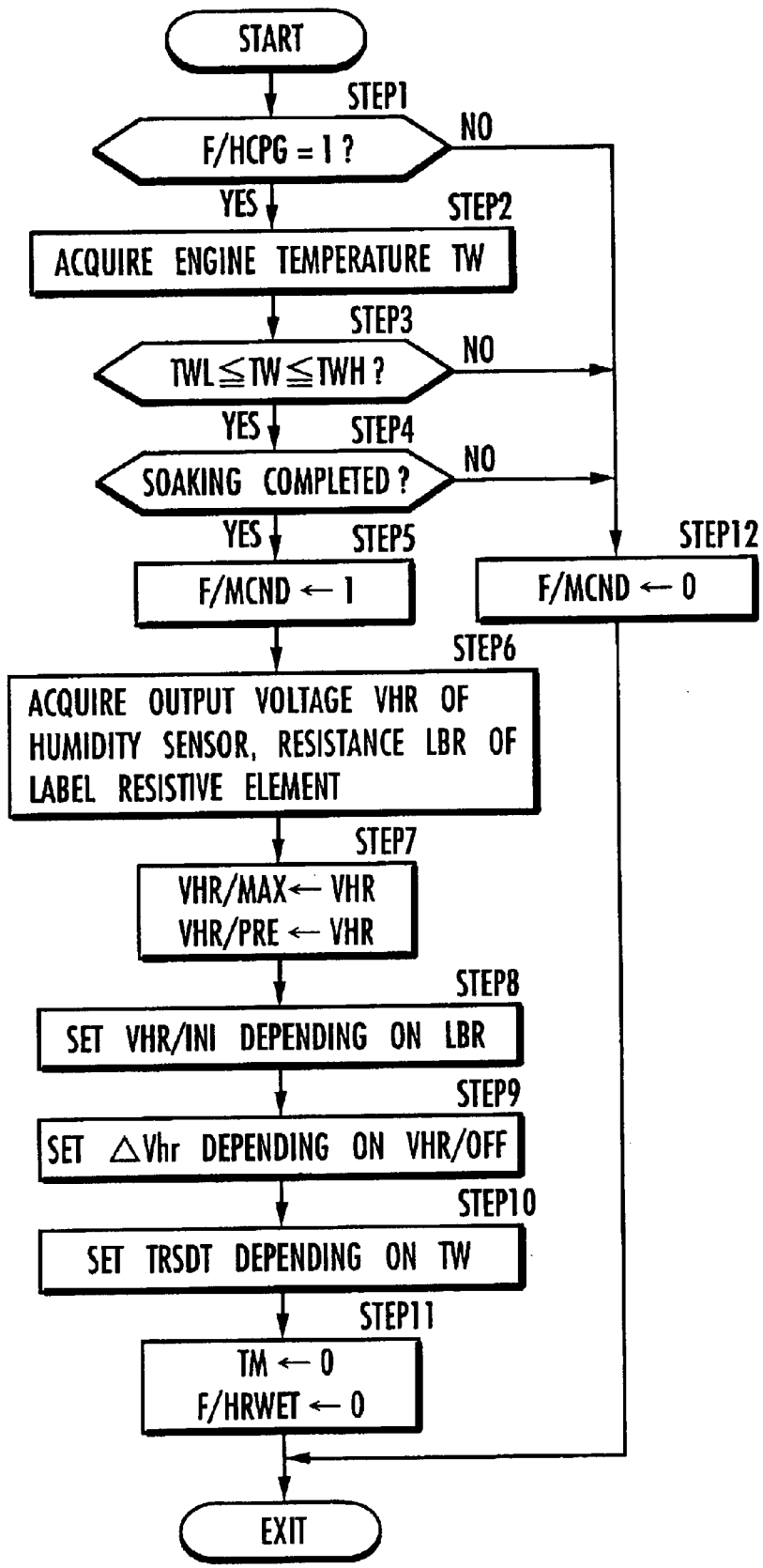
FIG. 6 is a flowchart of an operation sequence of the apparatus shown in FIG. 1.
Figure 9:
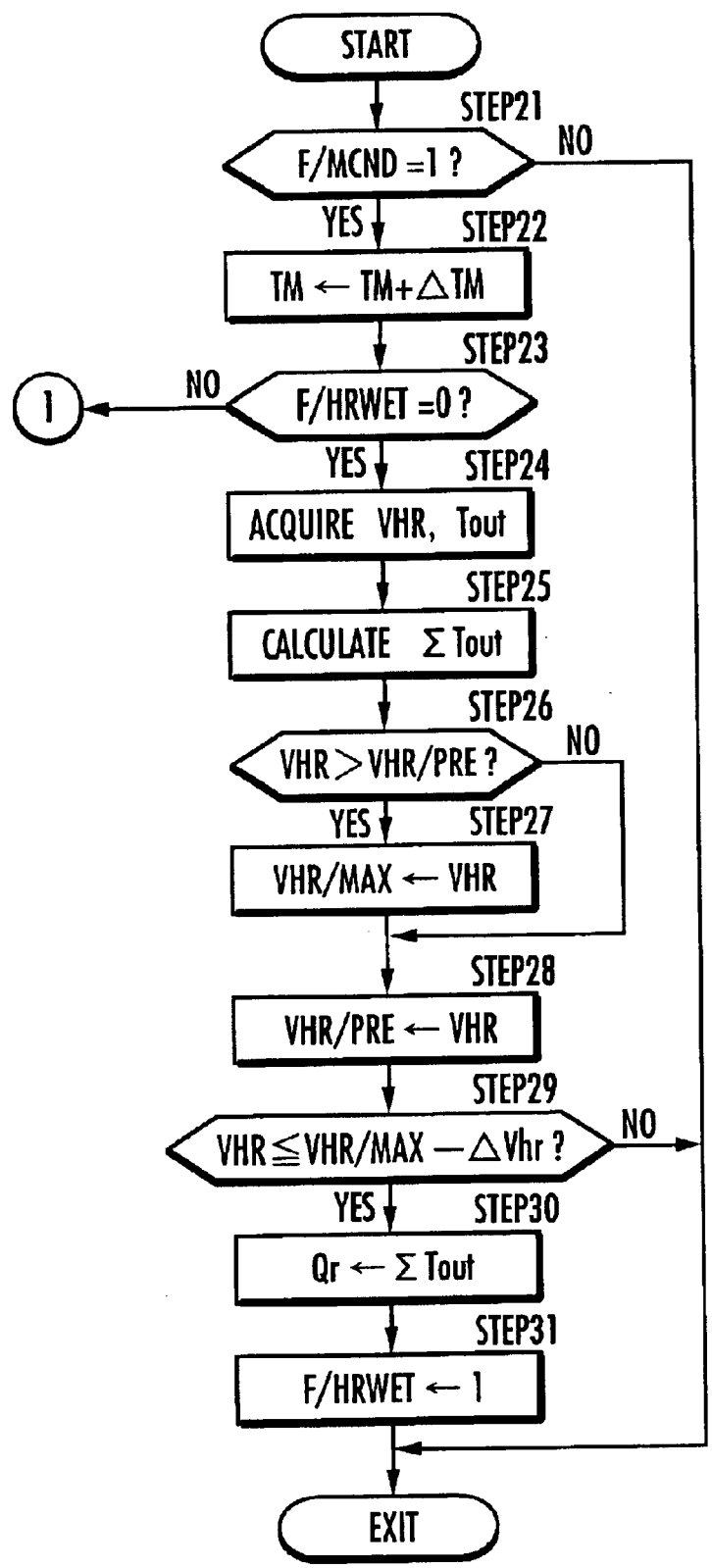
FIGS. 9 and 10 are a flowchart of another operation sequence of the apparatus shown in FIG. 1.
Figure 10:
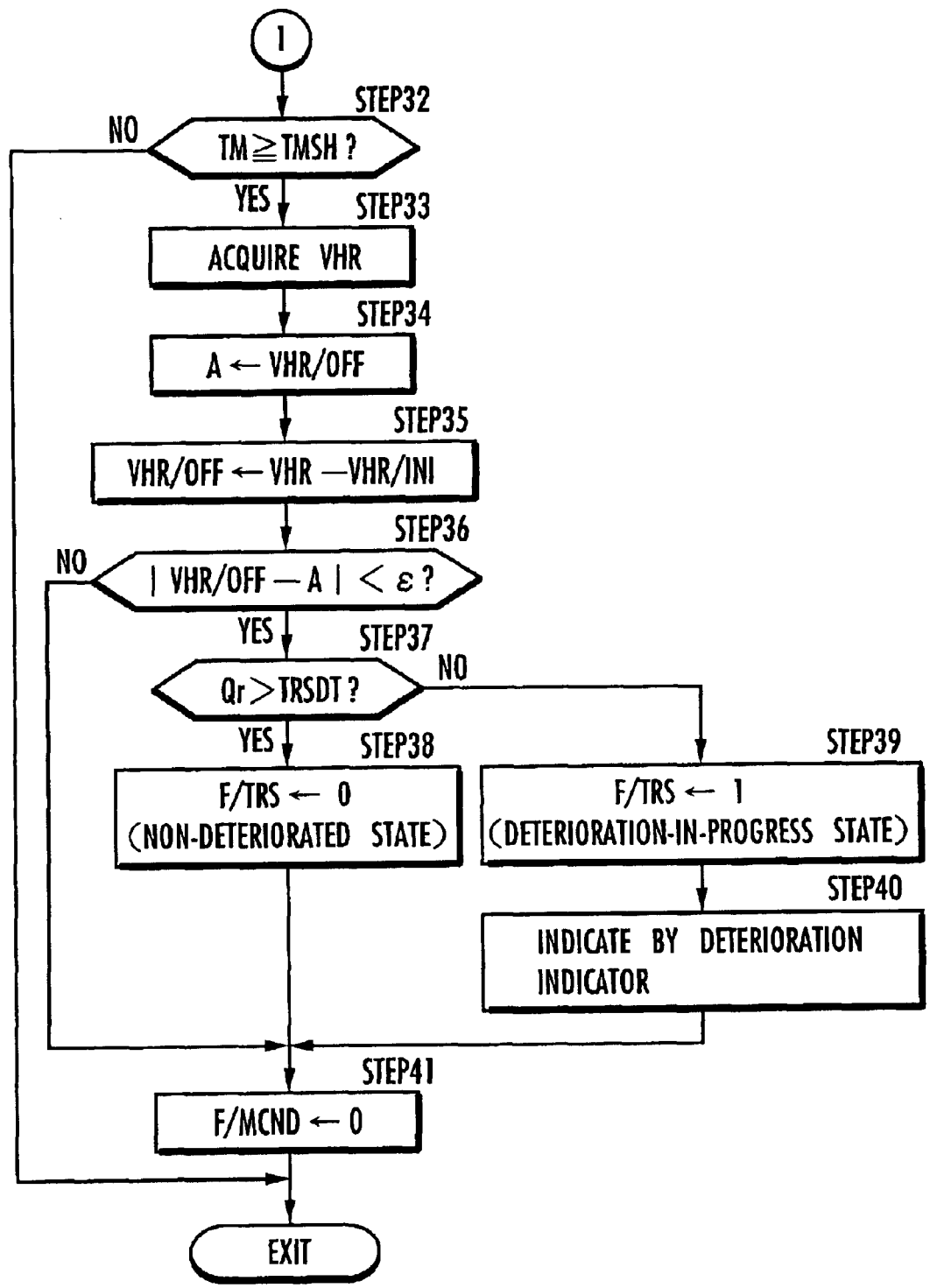

The deterioration evaluating device 21 performs a process shown in FIGS. 6, 9, and 10 to determine the deteriorated state of the HC adsorbent 12. Prior to specifically describing the process of the deterioration evaluating device 21, a basic concept of the time-dependent transition of the output voltage VHR of the humidity sensor 23 after the internal combustion engine 1 has started to operate and a process of evaluating the deteriorated state of the HC adsorbent 12 according to the present embodiment will first be described below.

When the internal combustion engine 1 starts operating, it emits an exhaust gas that is supplied through the exhaust system downstream of the internal combustion engine 1 to the HC adsorbent 12 of the exhaust gas purifier 7. At this time, since the exhaust system downstream of the internal combustion engine 1 and the HC adsorbent 12 have their temperatures equal to or lower than the dew point of moisture in the exhaust gas, the relative humidity of the exhaust gas upstream of the HC adsorbent 12 is a substantially constant relatively high humidity (about 100%). The relative humidity of the exhaust gas upstream of the HC adsorbent 12 does not become high the instant the internal combustion engine 1 starts operating, but changes from a low humidity level to a high humidity level with a slight time delay after the internal combustion engine 1 has started operating (see the two-dot-and-dash-line curve c in FIG. 5). This is because it takes a certain period of time for the exhaust gas (high-temperature exhaust gas) emitted from the internal combustion engine 1 to reach a region upstream of the HC adsorbent 12, the relative humidity around the HC adsorbent 12 is relatively low as the HC adsorbent 12 has adsorbed moisture present therearound during the previous shutdown of the internal combustion engine 1, and the catalytic converter 6 disposed upstream of the HC adsorbent 7 absorbs moisture in the exhaust gas.

When the exhaust gas emitted from the internal combustion engine 1 is supplied to the HC adsorbent after the internal combustion engine 1 has started to operate, moisture as well as HCs in the exhaust gas is adsorbed by the HC adsorbent 12 while the exhaust gas is passing through the HC adsorbent 12. Consequently, the relative humidity at the location of the humidity sensor 23 downstream of the HC adsorbent 12 is relatively low immediately after the internal combustion engine 1 has started to operate, and hence the output voltage VHR of the humidity sensor 23 is of a relatively high level. At this time, the output voltage VHR of the humidity sensor 23 that is disposed downstream of the HC adsorbent 2 is substantially constant as indicated by the solid-line curve a in FIG. 5, i.e., the relative humidity of the exhaust gas at the location of the humidity sensor 23 is of a substantially constant low level, immediately after the internal combustion engine 1 has started operating, though the output voltage VHR suffers slight variations due to disturbances.

As the adsorption of moisture by the HC adsorbent 12 progresses until it becomes saturated (the adsorption of HCs by the HC adsorbent 12 also becomes saturated), the HC adsorbent 12 no longer adsorbs moisture. Thus, the relative humidity downstream of the HC adsorbent 12 increases toward a high relative humidity level inherent in the exhaust gas, i.e., the relative humidity of the exhaust gas upstream of the HC adsorbent 12. Therefore, the output voltage VHR of the humidity sensor 23 changes to a tendency to decrease monotonously from the high voltage level toward a low voltage level which corresponds to the relative humidity inherent in the exhaust gas as indicated by the solid-line curve a.

As the HC adsorbent 12 is more deteriorated, the amounts of moisture and HCs that can be adsorbed by the HC adsorbent 12 are reduced. Therefore, the total amount of moisture that is carried by the exhaust gas to the HC adsorbent 12 after the internal combustion engine 1 has started to operate up to the timing (changing timing) at which the output voltage VHR of the humidity sensor 23 changes from a high voltage level to the tendency to decrease monotonously, i.e., the integrated amount of moisture, is reduced as the HC adsorbent 12 is progressively deteriorated. Consequently, the integrated amount of moisture that is supplied to the HC adsorbent 12 from the start of operation of the internal combustion engine 1 up to the changing timing depends on the deteriorated state (extent of deterioration) of the HC adsorbent 12.

There is an essentially constant correlation between the amount of fuel supplied to the internal combustion engine 1 (the amount of injected fuel) and the amount of moisture contained in the exhaust gas that is emitted when the mixture of the fuel and air is combusted. The integrated amount of moisture that is carried by the exhaust gas to the HC adsorbent 12 after the internal combustion engine 1 has started to operate is substantially proportional to an integrated value of a fuel injection quantity command value Tout that is generated by the ECU 20 at a timing synchronous with a so-called TDC signal, i.e., a timing synchronous with the rotational speed NE of the internal combustion engine 1. Therefore, an integrated value (accumulative sum) of the fuel injection quantity command value Tout that is sequentially calculated from the start of operation of the internal combustion engine 1 represents integrated moisture quantity data indicative of an integrated amount of moisture supplied to the HC adsorbent 12.

According to the present embodiment, basically, the deterioration evaluating device 21 sequentially accumulatively adds the fuel injection quantity command value Tout supplied from the ECU 20 after the internal combustion engine 1 has started to operate, thereby sequentially determining an integrated value (hereinafter referred to as "integrated fuel injection quantity ΣTout") of the fuel injection quantity command value Tout as the integrated moisture quantity data. Concurrently, the deterioration evaluating device 21 detects a changing timing at which the output voltage VHR of the humidity sensor 23 changes from a high voltage level to the tendency to decrease monotonously toward a low voltage level, i.e., a timing at which at which the adsorption of moisture by the HC adsorbent 12 is saturated. At this time, in view of fluctuations of the output voltage VHR of the humidity sensor 23 due to disturbances prior to the changing timing, the deterioration evaluating device 21 sequentially retrieves states in which the output voltage VHR of the humidity sensor 23 takes a maximum value, i.e., states in which the relative humidity represented by the output voltage VHR takes a minimum value, after the internal combustion engine 1 has started to operate, and detects a time (time t2 in FIG. 5) when the output voltage VHR of the humidity sensor 23 falls a preset value ΔVhr after it has taken a final maximum value, as the changing timing. Then, the deterioration evaluating device 21 acquires the integrated fuel injection quantity ΣTout (Qr in FIG. 5) at the changing timing as a deterioration evaluating parameter Qr, and compares the deterioration evaluating parameter Qr with a predetermined threshold to evaluate a deteriorated state of the DC adsorbent 12. The deterioration evaluating parameter Qr thus obtained basically depends on the total amount of moisture that is adsorbed by the HC adsorbent 12 after the internal combustion engine 1 has started to operate. Therefore, as the HC adsorbent 12 is more deteriorated, the deterioration evaluating parameter Qr is smaller.

In the present embodiment, the integrated fuel injection quantity ΣTout is used as the integrated moisture quantity data. However, the integrated moisture quantity data is not limited to the integrated fuel injection quantity ΣTout, but may be represented by other values. For example, an integrated value of a detected or estimated amount of intake air drawn after the internal combustion engine 1 has started to operate may be used as the integrated moisture quantity data. While the internal combustion engine 1 is idling, a period of time that has elapsed from the time the internal combustion engine 1 has started to operate may be used as the integrated moisture quantity data.

Figure 5:
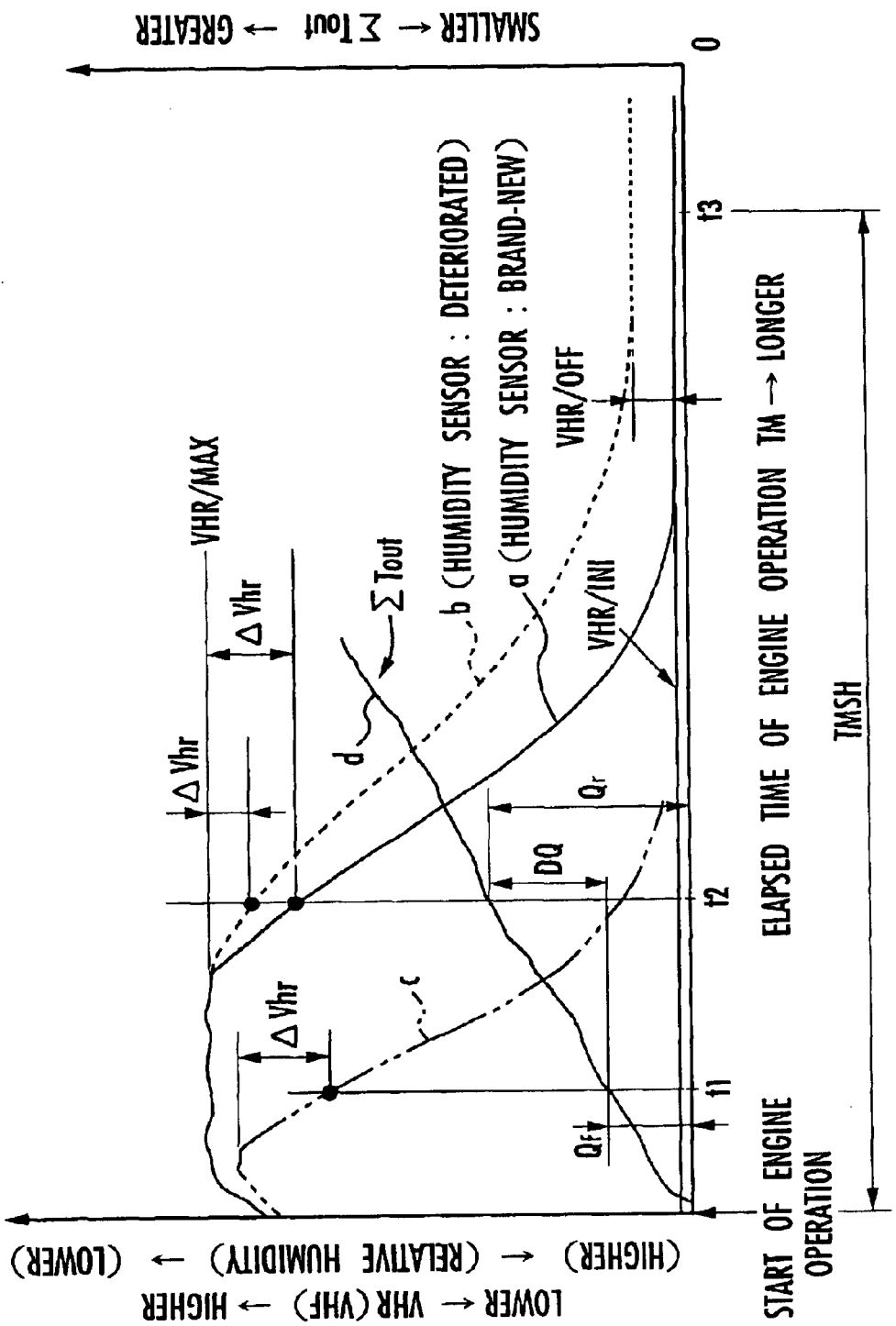
FIG. 5 is a graph showing the transition of the output signal of the humidity sensor in the apparatus shown in FIG. 1.

The above transition of the output voltage VHR of the humidity sensor 23 is also affected by characteristic changes of the humidity sensor 23 due to aging thereof. The solid-line curve a in FIG. 5 represents the characteristics of the humidity sensor 23 when it is brand-new. When the humidity sensor 23 suffers characteristic changes due to deterioration thereof, the output voltage VHR of the humidity sensor 23 undergoes transitional changes as indicated by the broken-line curve b in FIG. 5 after the internal combustion engine 1 has started to operate. Specifically, when the humidity sensor 23 suffers characteristic changes due to deterioration thereof, the rate at which the output voltage VHR of the humidity sensor 23 decreases from a high voltage level toward a low voltage level, i.e., the gradient of the broken-line curve b, is smaller than when the humidity sensor 23 is brand-new, and hence the output voltage VHR decreases more gradually.

The output voltage VHR of the humidity sensor 23 at the time the relative humidity of the exhaust gas at the location of the humidity sensor 23 finally reaches a high relative humidity level (about 100%) after the adsorption of moisture by the HC adsorbent 12 is saturated, e.g., the output voltage VHR at a time t3, is shifted toward a higher level as the HC adsorbent 12 is more deteriorated, i.e., the output voltage VHR suffers an offset. The output voltage VHR also suffers slight variations among different individual units of the humidity sensor 23 even if they are deteriorated to the same extent. For example, the output voltage VHR generated when the relative humidity of the exhaust gas at the location of the humidity sensor 23 reaches a substantially constant high relative humidity level (see VHR/INI in FIG. 5) after the adsorption of moisture by the HC adsorbent 12 is saturated, suffers slight variations among different individual units of the humidity sensor 23 due to variations of the circuit characteristics of those different individual units of the humidity sensor 23 even if they are brand-new.

In the process of evaluating the deteriorated state of the HC adsorbent 12 according to the present embodiment, the above characteristic changes of the humidity sensor 23 and variations of the characteristics of different individual units of the humidity sensor 23 are compensated for.

Based on the concept described above, the process that is performed by the deterioration evaluating device 21 will be described below. The deterioration evaluating device 21 carries out an operation sequence shown in FIG. 6 after it has been activated. The operation sequence shown in FIG. 6 is performed only when the internal combustion engine 1 starts to operate. According to the operation sequence shown in FIG. 6, the deterioration evaluating device 21 determines the value of a flag F/HCPG in STEP1. The flag F/HCPG is "1" if the release of HCs adsorbed by the HC adsorbent 12 in a preceding operation of the internal combustion engine 1 is completed, and "0" if not completed.

The flag F/HCPG is set by the ECU 20 while the internal combustion engine 1 is in operation. When the temperature of the HC adsorbent 12 is equal to or higher than a temperature at which HCs adsorbed by the HC adsorbent 12 are released, the ECU 20 determines an integrated value of the amount of gas that has flowed through the EGR passage 14 when the on/off valve 16 in the EGR passage 14 is open. If the determined integrated value becomes equal to or higher than a predetermined value, then the ECU 20 judges that the release of HCs adsorbed by the HC adsorbent 12 is completed (at this time, the release of moisture adsorbed by the HC adsorbent 12 is also completed). The ECU 20 thus sets the flag F/HCPG to "1". If the determined integrated value is lower than the predetermined value, then the ECU 20 sets the flag F/HCPG to "0", The flag F/HCPG is stored in a nonvolatile memory such as an EEPROM or the like (not shown) or a memory which is energized at all times when the internal combustion engine 1 is shut off, so that the flag F/HCPG will not be lost when the internal combustion engine 1 is not operating.

If F/HCPG=0 in STEP1, then since the release of HCs and moisture from the HC adsorbent 12 is not completed in the preceding operation of the internal combustion engine 1, i.e., the HC adsorbent 12 has already adsorbed moisture in the present operation of the internal combustion engine 1, the deterioration evaluating device 21 sets a flag F/MCND to "0" in STEP12, and puts the operation sequence shown in FIG. 6 to an end. If the flag F/MCND is set to "0", then it means that the apparatus is in a state not suitable for evaluating the deteriorated state of the HC adsorbent 12 or the present process of evaluating the deteriorated state of the HC adsorbent 12 has already been finished. If the flag F/MCND is set to "1", then it means that the apparatus is in a state to evaluate a deteriorated state of the HC adsorbent 12.

If F/HCPG=1 in STEP1, then the deterioration evaluating device 21 acquires from the ECU 20 detected data representative of the present engine temperature TW (hereinafter referred to as "initial engine temperature TW") of the internal combustion engine 1 as data representative of the temperature of the HC adsorbent 12 at the start of operation of the internal combustion engine 1 in STEP2. If the apparatus has a temperature sensor for detecting the temperature of the HC adsorbent 12 or a nearby region, then the above data may be detected from the temperature sensor.

Thereafter, the deterioration evaluating device 21 determines whether the engine temperature TW is in a predetermined range (TWL≦TW≦THW) or not in STEP3. If the engine temperature TW is not in the predetermined range, then the deterioration evaluating device 21 judges that the apparatus is not in a state capable of adequately evaluating the deteriorated state of the HC adsorbent 12, and sets the flag F/MCND to "0" in STEP12 and then puts the operation sequence shown in FIG. 6 to an end. This is because the deteriorated state of the HC adsorbent 12 cannot adequately be evaluated if the temperature of the HC adsorbent 12 is excessively low (e.g., 0° C. or lower) or if the temperature of the HC adsorbent 12 is excessively high (e.g., 50° C. or higher).

If the engine temperature TW is in the predetermined range in STEP3, then the deterioration evaluating device 21 determines whether soaking prior to the start of the present operation of the internal combustion engine 1 has been completed or not in STEP4. When soaking is completed, the temperature of the internal combustion engine 1 and its exhaust system (the exhaust gas purifier 7, etc.) has dropped to a temperature (steady temperature) as which is about the same as the atmospheric temperature after the internal combustion engine 1 has stopped operating. In STEP4, the completion of soaking is determined based on the period of time that has elapsed after the internal combustion engine 1 has stopped operating. If the period of time that has elapsed after the internal combustion engine 1 has stopped operating is four hours or more, then the deterioration evaluating device 21 judges that soaking has been completed. If the apparatus has an atmospheric temperature sensor, then the completion of soaking may be determined in STEP4 based on whether the detected engine temperature TW has substantially converged to the atmospheric temperature detected by the atmospheric temperature sensor.

If the answer to STEP 4 is NO, i.e., if it is judged that soaking is not completed in STEP4, then the deterioration evaluating device 21 judges that the apparatus is not in a state capable of adequately evaluating the deteriorated state of the HC adsorbent 12, and sets the flag F/MCND to "0" in STEP12 and then puts the operation sequence shown in FIG. 6 to an end. This is because when soaking is not completed, the humidity (relative humidity) in the vicinity of the HC adsorbent 12 and the ability of the HC adsorbent 12 to adsorb moisture tend to be stable due to the remaining heat of the internal combustion engine 1 and the HC adsorbent 12.

If the answer to STEP 4 is YES, i.e., if it is judged that soaking is completed in STEP4, then since basic requirements for carrying out the process of evaluating the deteriorated state of the HC adsorbent 12 have been satisfied, the deterioration evaluating device 21 sets the flag F/MCND to "1" in STEP5. Thereafter, the deterioration evaluating device 21 acquires present data of the output voltage VHR of the humidity sensor 23 from the humidity sensor 23, and also acquires data of the resistance LBR of the label resistive element 26 through the resistance detecting circuit 27 in STEP6.

The deterioration evaluating device 21 sets the present value of the output voltage VHR of the humidity sensor 23 acquired in STEP6 as an initial value of a parameter VHR/MAX (hereinafter referred to as "maximum output parameter VHR/MAX") representative of the latest value of a maximum value of the output voltage VHR of the humidity sensor 23 and a parameter VHR/PRE (hereinafter referred to as "preceding output parameter VHR/PRE") representative of a preceding value of the output voltage VHR, i.e., a preceding value in each cycle time of an operation sequence shown in FIGS. 9 and 10 to be described later on, in STEP7. Inasmuch as the output voltage VHR of the humidity sensor 23 has a negative humidity coefficient (see FIG. 3), i.e., it decreases as the relative humidity of the exhaust gas increases, the maximum value of the output voltage VHR of the humidity sensor 23 corresponds to the minimum value of the relative humidity detected by the humidity sensor 23, i.e., the humidity recognized from the output voltage VHR based on the characteristics shown in FIG. 3.

Then, the deterioration evaluating device 21 sets the value of a parameter VHR/INI for compensating for characteristic variations of individual units of the humidity sensor 23 in the process, to be described later on, for evaluating the deterioration of the HC adsorbent 12, from the detected data of the resistance LBR of the label resistive element 26 that has been acquired in STEP6, in STEP8. As shown in FIG. 5, the parameter VHR/INI signifies the output voltage VHR of the humidity sensor 23 when the relative humidity at the location of the humidity sensor 23 is a substantially constant high humidity (about 100%) after the internal combustion engine 1 has started to operate if the humidity sensor 23 is brand-new. As described above, the parameter VHR/INI suffers slight variations among different individual units of the humidity sensor 23 due to variations of the circuit characteristics of those individual units of the humidity sensor 23. According to the present embodiment, the value of the parameter VHR/INI is used as a basic indicator of the characteristics of individual units of the humidity sensor 23, and variations of the characteristics of those individual units of the humidity sensor 23 are compensated for using the value of the parameter VHR/INI. In STEP8, the value of the parameter VHR/INI (hereinafter referred to as "individual sensor characteristic parameter VHR/INI") is determined from the detected data of the resistance LBR of the label resistive element 26 based on a predetermined data table.

Then, the deterioration evaluating device 21 sets the preset value ΔVhr, i.e., a threshold with respect to a change from the maximum value of the output voltage VHR of the humidity sensor 23, for detecting the changing timing, depending on the value of the parameter VHR/OFF that has been acquired in a past operation of the internal combustion engine 1 (usually the preceding operation thereof) as representing a characteristic change of the humidity sensor 23, i.e., a characteristic change due to a deterioration from the brand-new state of the humidity sensor 23, in STEP9. As shown in FIG. 5, the parameter VHR/OFF signifies a change (offset), from the individual sensor characteristic parameter VHR/INI (the output voltage in the brand-new state of the humidity sensor 23), of the output voltage VHR of the humidity sensor 23 when the relative humidity at the location of the humidity sensor 23 is a substantially constant high humidity after the internal combustion engine 1 has started to operate, and increases as the HC adsorbent 12 is more deteriorated. According the present embodiment, therefore, the parameter VHR/OFF is used as characteristic change detecting data representative of a characteristic change (extent of deterioration) due to a deterioration of the humidity sensor 23. The parameter VHR/OFF is determined in the process while the internal combustion engine 1 is in operation as described later on. The parameter VHR/OFF that is used to set the changing timing detecting preset value ΔVhr in STEP9 when the internal combustion engine 1 starts to operate is the latest one of values that have been determined while the internal combustion engine 1 has operated in the past.

Figure 7:
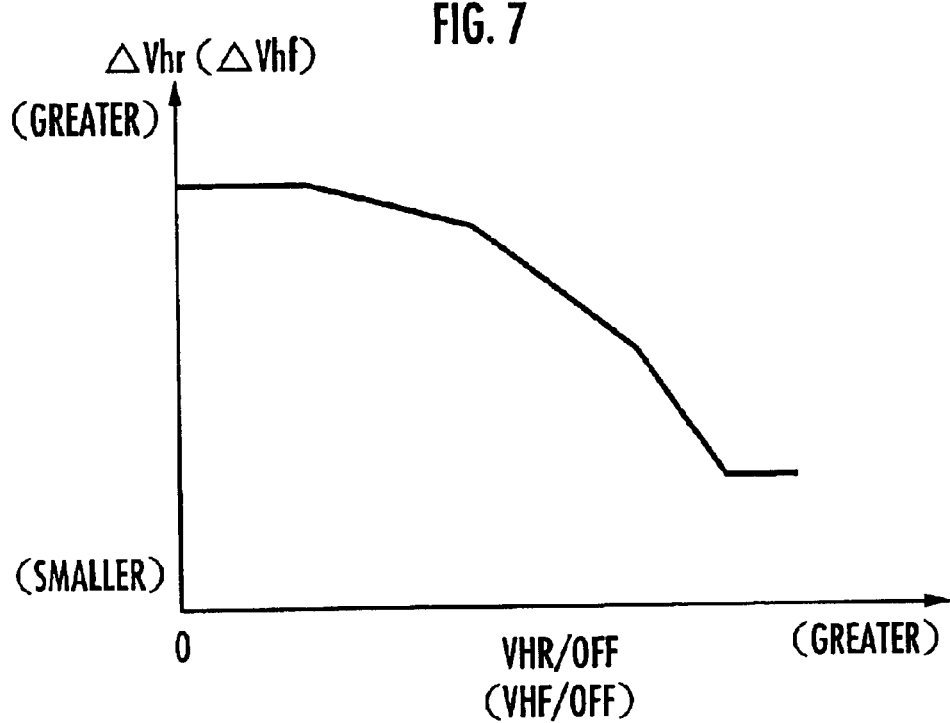
FIG. 7 is a graph showing a data table used in the operation sequence shown in FIG. 6.

When the output voltage VHR of the humidity sensor 23 changes from a high voltage level to a low voltage level after the internal combustion engine 1 has started to operate, the extent to which the output voltage VHR decreases becomes smaller (the gradient of the output voltage VHR as it decreases becomes smaller) as the humidity sensor 23 is progressively deteriorated. If the preset value ΔVhr is a constant value, then as the humidity sensor 23 is progressively deteriorated, the time for detecting the changing timing depending on the saturation of the adsorption of moisture by the HC adsorbent 12 is more delayed. In STEP9, therefore, the deterioration evaluating device 21 sets the preset value ΔVhr (hereinafter referred to as "changing timing detecting preset value ΔVhr") depending on the parameter VHR/OFF (hereinafter referred to as "sensor deterioration parameter VHR/OFF") according to a predetermined data table shown in FIG. 7. FIG. 7 shows that as the sensor deterioration parameter VHR/OFF is greater, the humidity sensor 23 is deteriorated to a greater extent. Therefore, the changing timing detecting preset value ΔVhr is basically set to a smaller value as the value of the sensor deterioration parameter VHR/OFF is greater.

Figure 8:
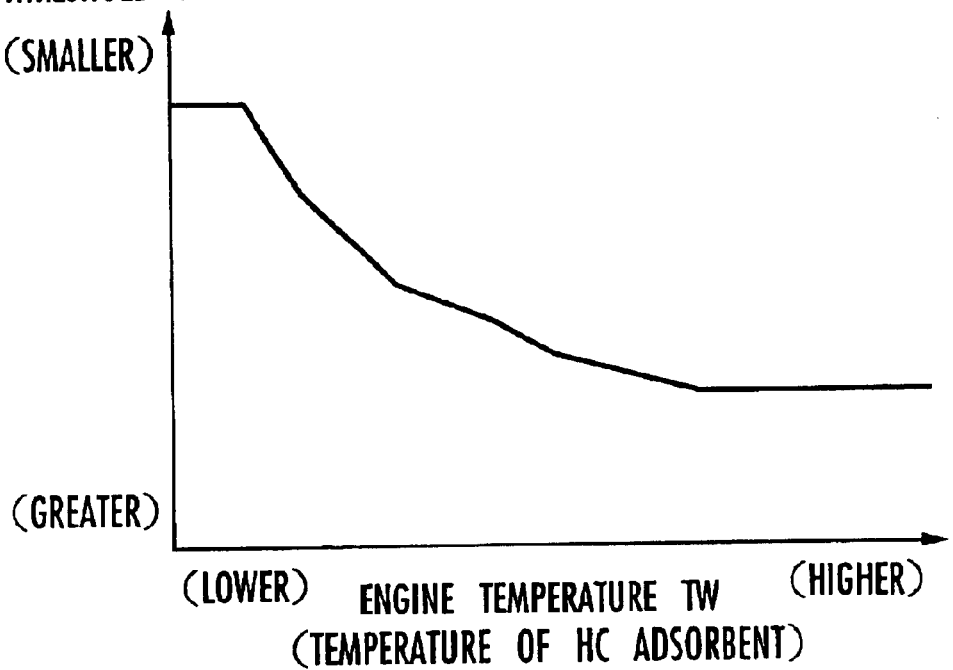
FIG. 8 is a graph showing another data table used in the operation sequence shown in FIG. 6.

Then, the deterioration evaluating device 21 determines a deterioration evaluating threshold TRSDT with which to determine whether the HC adsorbent 12 is in the deterioration-in-progress state or the non-deteriorated state from the detected data of the initial engine temperature TW acquired in STEP2 according to a predetermined data table shown in FIG. 8 in STEP10. The deterioration evaluating threshold TRSDT corresponds to a maximum amount of moisture that can be adsorbed by the HC adsorbent 12 when the HC adsorbent 12 is deteriorated to a boundary between the non-deteriorated state and the deterioration-in-progress state. The lower the temperature of the HC adsorbent 12, the greater the maximum amounts of moisture and HCs that can be adsorbed by the HC adsorbent 12. Therefore, according to the data table shown in FIG. 8, the deterioration evaluating threshold TRSDT is experimentally determined such that it is basically greater as the initial engine temperature TW of the internal combustion engine 1 is lower, i.e., as the temperature of the HC adsorbent 12 at the time the internal combustion engine 1 starts to operate is lower. In the present embodiment, as described above, the integrated fuel injection quantity ΣTout from the time the internal combustion engine 1 starts to operate to the changing timing is used as the deterioration evaluating parameter Qr for evaluating the deteriorated state of the HC adsorbent 12. The deterioration evaluating threshold TRSDT is thus a threshold with respect to the integrated fuel injection quantity Qr=ΣTout at the changing timing.

Then, the deterioration evaluating device 21 initializes, to "0", a timer TM (count-up timer) which measures a time that has elapsed from the start of operation of the internal combustion engine 1 (hereinafter referred to as "engine operation elapsed time"), and also initializes a flag F/HRWET to "0" in STEP11. Thereafter, the operation sequence shown in FIG. 6 is ended. The flag F/HRWET is "1" when the output voltage VHR of the humidity sensor 23 changes from a high voltage level to a low voltage level after the internal combustion engine 1 has started to operate, and "0" when the output voltage VHR of the humidity sensor 23 does not change from a high voltage level to a low voltage level.

After having carried out the operation sequence shown in FIG. 6 when the internal combustion engine 1 starts to operate, the deterioration evaluating device 21 carries out an operation sequence shown in FIGS. 9 and 10 in a given cycle time to evaluate the deteriorated state of the HC adsorbent 12.

In the operation sequence shown in FIGS. 9 and 10 (hereinafter referred to as "deterioration evaluating process"), the deterioration evaluating device 21 determines the value of the flag F/MCND set as described above when the internal combustion engine 1 starts to operate in STEP21 shown in FIG. 9. If F/MCND=0, then since the apparatus is in a state not suitable for evaluating the deteriorated state of the HC adsorbent 12 or the present process of evaluating the deteriorated state of the HC adsorbent 12 has already been finished, the deterioration evaluating device 21 puts the deterioration evaluating process shown in FIGS. 9 and 10 to an end.

If F/MCND=1 in STEP21, then the deterioration evaluating device 21 increments the value of the timer M, which has been initialized to "0" in the process shown in FIG. 6 when the internal combustion engine 1 starts to operate, for measuring the engine operation elapsed time, by a predetermined value ΔTM (fixed value) in STEP22, and then determines the value of the flag F/HRWET in STEP23. Inasmuch as the value of the flag F/HRWET is initialized at this time in the process shown in FIG. 6 when the internal combustion engine 1 starts to operate, F/HRWET=0 immediately after the internal combustion engine 1 has started to operate. Because the value of the timer TM represents the engine operation elapsed time, the engine operation elapsed time will hereinafter be denoted by TM.

If F/HRWET=0 in STEP23, then the deterioration evaluating device 21 acquires present detected data of the output voltage VHR of the humidity sensor 23 from the humidity sensor 23, and also acquires the present fuel injection quantity command value Tout from the ECU 20 in STEP24. Then, the deterioration evaluating device 21 calculates the integrated fuel injection quantity ΣTout which represents an integrated value (accumulative sum) of the fuel injection quantity command value Tout in STEP25. The deterioration evaluating device 21 calculates the integrated fuel injection quantity ΣTout each time STBP25 is executed by adding the fuel injection quantity command value Tout acquired in STEP24 to the present value of the integrated fuel injection quantity ΣTout.

Then, the deterioration evaluating device 21 compares the present output voltage VHR of the humidity sensor 23 acquired in STEP24 with the present value of the preceding output parameter VHR/PRE in STEP26. If VHR>VHR/PRE, then the deterioration evaluating device 21 updates the value of the maximum output parameter VHR/MAX into the present value of the output voltage VHR of the humidity sensor 23 in STEP27, and also updates the value of the preceding output parameter VHR/PRE into the present value of the output voltage VHR in STEP28. If VHR≦VHR/PRE in STEP26, then the deterioration evaluating device 21 does not update the value of the maximum output parameter VHR/MAX in STEP27, but updates the value of the preceding output parameter VHR/PRE in STEP28. In the processing of STEP26–STEP28, maximum values of the output voltage VHR of the humidity sensor 23, i.e., minimum values taken by the relative humidity represented by the output voltage VHR, are sequentially retrieved after the internal combustion engine 1 has started to operate.

Then, the deterioration evaluating device 21 compares the present value of the output voltage VHR of the humidity sensor 23 with a value (VHR/MAX−ΔVhr) which is produced by subtracting the changing timing detecting preset value ΔVhr set in the process shown in FIG. 6 from the present value of the maximum output parameter VHR/MAX (the latest value of VHR/MAX) in STEP29. If VHR>VHR/MAX−ΔVhr, i.e., if the present output voltage VHR of the humidity sensor 23 is not smaller than the latest maximum output parameter VHR/MAX by ΔVhr, then the timing of the present cycle time has not yet reached the changing timing. In this case, the deterioration evaluating device 21 puts the deterioration evaluating+ process in the present cycle time to an end.

If VHR≦VHR/MAX−ΔVhr in STEP29, then the present output voltage VHR of the humidity sensor 23 is smaller than the latest maximum output parameter VHR/MAX by ΔVhr or greater. In this case, the deterioration evaluating device 21 judges that the timing of the present cycle time (time t2 in FIG. 5) is the changing timing, and holds the present integrated fuel injection quantity ΣTout as the deterioration evaluating parameter Qr for evaluating the deteriorated state of the HC adsorbent 12 in STEP30. Since the output voltage VHR of the humidity sensor 23 has changed from a high voltage level to a low voltage level, the deterioration evaluating device 21 sets the flag F/HRWET to "1" in STEP33, and ends the deterioration evaluating process in the present cycle time.

After the changing timing of the output voltage VHR of the humidity sensor 23 is detected and the deterioration evaluating parameter Qr is obtained as described above, the answer to STEP23 with respect to the value of the flag F/HRWET becomes NO. Then, as shown in FIG. 10, the deterioration evaluating device 21 determines whether the engine operation elapsed time TM has reached a predetermined value TMSH or not in STEP32. STEP32 serves to determine whether the output voltage VHR of the humidity sensor 23 has converged to a substantially constant low voltage level after the changing timing or not. Thus, as shown in FIG. 5, the predetermined value TMSH is determined in advance such that when the engine operation elapsed time TM has reached the predetermined value TMSH, the output voltage VHR of the humidity sensor 23 converges to a substantially constant low voltage level regardless of the deteriorated state of the humidity sensor 23. If the answer to STEP32 is NO, then since the output voltage VHR of the humidity sensor 23 is possibly still on the decrease, the deterioration evaluating device 21 finishes the deterioration evaluating process in the present cycle time. In the present embodiment, the deterioration evaluating device 21 compares the engine operation elapsed time TM with the predetermined value TMSM to determine whether the output voltage VHR of the humidity sensor 23 has converged to a substantially constant low voltage level subsequent to the changing timing. However, the deterioration evaluating device 21 may compare the integrated fuel injection quantity ΣTout as the integrated moisture quantity data with a predetermined value to determine whether the output voltage VHR of the humidity sensor 23 has converged to a substantially constant low voltage level subsequent to the changing timing.

If TM≧TMSH in STEP32, then the deterioration evaluating device 21 acquires the present data of the output voltage VHR of the humidity sensor 23 in STEP33. Thereafter, the deterioration evaluating device 21 stores the present value of the sensor deterioration parameter VHR/OFF, i.e., the value of VHR/OFF that has been used to set the changing timing detecting preset value ΔVhr in the process shown in FIG. 6 at the start of the present operation of the internal combustion engine 1, as the value of a parameter A in STEP34. Then, the deterioration evaluating device 21 determines, as a new value of the sensor deterioration parameter VHR/OFF, a value that is produced by subtracting the individual sensor characteristic parameter VHR/INI determined depending on the resistance LBR of the label resistive element 26, i.e., depending on the characteristics of the individual unit of the humidity sensor 23, in the process shown in FIG. 6 when the internal combustion engine 1 has started to operate, from the present value of the output voltage VHR of the humidity sensor 23 (acquired in STEP33), in STEP35. Since the sensor deterioration parameter VHR/OFF thus determined represents an offset of the output voltage VHR of the humidity sensor 23, i.e., an offset due to a deterioration of the humidity sensor 23, from the individual characteristic parameter VHR/INI of the humidity sensor 23, the sensor deterioration parameter VHR/OFF indicates the present deteriorated state (characteristic change state) of the humidity sensor 23 independent of characteristic variations of individual units of the humidity sensor 23. The value of the sensor deterioration parameter VHR/OFF is stored in a nonvolatile memory such as an EEPROM or the like or a memory which is energized at all times, so that the sensor deterioration parameter VHR/OFF will not be lost when the internal combustion engine 1 is shut off.

Then, the deterioration evaluating device 21 determines whether the absolute value |VHR/OFF−A| of the difference between the newly determined sensor deterioration parameter VHR/OFF and the preceding value of the sensor deterioration parameter which has previously been stored as the value of the parameter A is smaller than a predetermined value ε or not in STEP36. The predetermined value ε is determined in advance as a sufficiently small positive value. If the answer to STEP36 is NO, then it means that the value of VHR/OFF used to set the changing timing detecting preset value ΔVhr in the process shown in FIG. 6 when the internal combustion engine 1 starts to operate has a relatively large error with respect to the value of the newly determined sensor deterioration parameter VHR/OFF, which represents the present extent of deterioration of the humidity sensor 23. Consequently, if the answer to STEP36 is NO, then the changing timing detecting preset value ΔVhr used in STEP29 in the present operation of the internal combustion engine 1 may possibly not correspond to the present deteriorated state of the humidity sensor 23. In this case, the deterioration evaluating device 21 does not essentially evaluate the deteriorated state of the humidity sensor 23 based on the deterioration evaluating parameter Qr, which has been determined in STEP30 in the present operation of the internal combustion engine 1, but resets the flag F/MCND to "0" in STEP41. Thereafter, the deterioration evaluating process in the present cycle time is put to an end. In this case, therefore, the deterioration evaluating process in the present operation of the internal combustion engine 1 is virtually interrupted.

If the answer to STEP36 is YES, then the deterioration evaluating device 21 determines whether the HC adsorbent 12 is in the deterioration-in-progress state or the non-deteriorated state, i.e., virtually evaluates the deteriorated state of the HC adsorbent 12, based on the deterioration evaluating parameter Qr that is determined in STEP30, in STEP37–STEP40. Specifically, the deterioration evaluating device 21 compares the value of the deterioration evaluating parameter Qr that is determined in STEP30 with the deterioration evaluating threshold TRSDT that is set in the process shown in FIG. 6 when the internal combustion engine 1 starts to operate in STEP37.

If Qr>TRSDT, then the deterioration evaluating device 21 sets a flag F/TRS to "0" (the non-deteriorated state) in STEP38. The flag F/TRS is "0" if the HC adsorbent 12 is in the non-deteriorated state, and "1" if the HC adsorbent 12 is in the deterioration-in-progress state. If Qr≦TRSDT, then deterioration evaluating device 21 sets the flag F/TRS to "1" as the HC adsorbent 12 is in the deterioration-in-progress state in STEP39. Then, the deterioration evaluating device 21 controls the deterioration indicator 22 to indicate that the catalytic converter 3 is in the deterioration-in-progress state in STEP40. After having thus determined the deteriorated state of the HC adsorbent 12, the deterioration evaluating device 21 sets the flag F/MCND to "0" in STEP41, and then ends the deterioration evaluating process.

In the above embodiment, the changing timing detecting preset value ΔVhr is set depending on the sensor deterioration parameter VHR/OFF which is representative of a characteristic change due to a deterioration of the humidity sensor 23. The reference value VHR/INI serving as a reference for the sensor deterioration parameter VHR/OFF is set depending on the resistance LBR of the label resistive element 26 that represents the characteristics of the individual unit of the humidity sensor 23. Therefore, the changing timing detected using the changing timing detecting preset value ΔVhr depends on the deteriorated state of the HC adsorbent 12 regardless of a characteristic change due to a deterioration of the humidity sensor 23 and characteristic variations of individual humidity sensors 23. Consequently, the deterioration evaluating parameter Qr that is obtained as the integrated fuel injection quantity ΣTout at the changing timing is highly reliable as representing the deteriorated state of the HC adsorbent 12, more accurately, an amount of moisture that can be adsorbed by the HC adsorbent 12. Therefore, it is possible to adequately evaluate the deteriorated state of the HC adsorbent 12 based on the deterioration evaluating parameter Qr while compensating for characteristic changes of the humidity sensor 23 due to a deterioration thereof and for characteristic variations among individual sensors 23. Since characteristic changes of the humidity sensor 23 and characteristic variations among individual sensors 23 can be compensated for, requirements for the steadiness of the characteristics of individual sensors 23 and the uniformity of the characteristics of individual sensors 23 are made less stringent. Consequently, the cost required to develop the humidity sensor 23 and the cost required to manufacture the humidity sensor 23 are reduced.

An apparatus for evaluating the deteriorated state of a hydrocarbon adsorbent according to a second embodiment of the present invention will be described below with reference to FIGS. 11 through 13. The apparatus according to the second embodiment differs from the apparatus according to the first embodiment as to some details only. Those parts of the first embodiment which are structurally or functionally identical to those of the first embodiment are denoted by identical reference characters in identical figures, and will not be described in detail below.

As shown in FIG. 1, the apparatus according to the second embodiment has a humidity sensor 24 disposed upstream of the HC adsorbent 12 of the exhaust gas purifier 7, in addition to the humidity sensor 23 disposed downstream of the HC adsorbent 12. The humidity sensor 24 produces an output voltage VHF, i.e., an output voltage depending on the relative humidity upstream of the HC adsorbent 12, that is given together with the output voltage VHR of the downstream humidity sensor 23 to the deterioration evaluating device 21. The upstream humidity sensor 24 is mounted on the branch passage 9 as shown in FIG. 2, for example, for detecting the relative humidity upstream of the HC adsorbent 12 in the vicinity of the HC adsorbent 12. The humidity sensor 24 is of the same type as the humidity sensor 23, and has the same output characteristics as the humidity sensor 23 or a negative humidity coefficient, i.e., it decreases as the humidity (relative humidity) of the exhaust gas increases. In FIG. 3, the output voltages VHR, VHF of the humidity sensors 23, 24 are shown as having the same characteristics with respect to the relative humidity. However, the output characteristics of the humidity sensors 23, 24 are not required to be completely identical to each other.

As with the downstream humidity sensor 23, the upstream humidity sensor 24 according to the second embodiment is electrically connected to the deterioration evaluating device 21 by two connectors 25a, 25b, as shown in FIG. 4. The connector 25a closer to the upstream humidity sensor 24 has a label resistive element 26 having a resistance depending on the characteristics actually measured for each individual humidity sensor 23. With the upstream humidity sensor 24 electrically connected to the deterioration evaluating device 21, the deterioration evaluating device 21 detects the resistance of the label resistive element 26 which is related to the inherent characteristics of the upstream humidity sensor 24, and recognizes the characteristics of the upstream humidity sensor 24, which specifically correspond to the individual sensor characteristic parameter VHR/INI with respect to the downstream humidity sensor 23, based on the detected resistance. Other details of the apparatus according to the second embodiment are identical to those of the apparatus according to the first embodiment. In the second embodiment, the deterioration evaluating device 21 functions as the upstream changing timing detecting means, the downstream changing timing detecting means, the characteristic change detecting means, and the characteristic change compensating means according to the second aspect of the present invention.

A summary of a process of evaluating the deteriorated state of the HC adsorbent 12 in the second embodiment will first be described below with reference to FIG. 5. As described above with respect to the first embodiment, the relative humidity of the exhaust gas upstream of the HC adsorbent 12, i.e., the relative humidity near the inlet of the bypass exhaust pipe 11 which houses the HC adsorbent 12 therein, after the internal combustion engine 1 has started operating does not become high the instant the internal combustion engine 1 starts operating, but changes from a low humidity level to a high humidity level with a slight time delay after the internal combustion engine 1 has started operating. Therefore, the output voltage VHF of the upstream humidity sensor 24 changes from a high voltage lever to a low voltage level with a slight time delay from the start of operation of the internal combustion engine 1, as indicated by the imaginary-line curve c in FIG. 5. The changing timing at which the relative humidity upstream of the HC adsorbent 12, i.e., the relative humidity detected by the upstream humidity sensor 24, changes from a low humidity to a high humidity, or the changing timing (time t1 in FIG. 5) at which the output voltage VHF of the upstream humidity sensor 24 changes from a high voltage level to a low voltage level, may vary due to the absorption of moisture by the catalytic converter 6. If the changing timing of the relative humidity upstream of the HC adsorbent 12 becomes earlier, then the timing at which the exhaust gas containing much moisture starts being supplied to the HC adsorbent 12, i.e., the timing at which the HC adsorbent 12 starts adsorbing moisture, becomes earlier. Therefore, the saturation of the adsorption of moisture by the HC adsorbent 12 also becomes earlier, and hence the changing timing of the relative humidity downstream of the HC adsorbent 12 or the changing timing of the output voltage VHR of the downstream humidity sensor 23 becomes earlier. Conversely, if the changing timing of the relative humidity upstream of the HC adsorbent 12 becomes later, the changing timing of the relative humidity downstream of the HC adsorbent 12 or the changing timing of the output voltage VHR of the downstream humidity sensor 23 becomes later.

If the changing timing of the relative humidity upstream of the HC adsorbent 12 varies as described above, then it is preferable to recognize an integrated amount of moisture that is carried by the exhaust gas to the HC adsorbent 12 from the changing timing of the relative humidity upstream of the HC adsorbent 12 to the changing timing of the relative humidity downstream of the HC adsorbent 12 for recognizing the total amount of moisture adsorbed by the HC adsorbent 12 after the internal combustion engine 1 has started to operate. According to the present embodiment, not only the changing timing of the output voltage VHR of the downstream humidity sensor 23 (hereinafter referred to as "downstream changing timing"), but also the changing timing of the output voltage VHF of the upstream humidity sensor 24 (hereinafter referred to as "upstream changing timing") are detected. Integrated moisture quantity data representative of an integrated amount of moisture that is supplied to the HC adsorbent 12 from the upstream changing timing to the downstream changing timing is determined as a deterioration evaluating parameter for evaluating the deteriorated state of the HC adsorbent 12. In order to generate integrated moisture quantity data, the integrated fuel injection quantity ΣTout which represents an integrated value of the fuel injection quantity command value Tout is used as with the first embodiment. More specifically, as shown in FIG. 5, if an integrated fuel injection quantity ΣTout at the upstream changing timing (t1 in FIG. 5) is represented by Qf and an integrated fuel injection quantity ΣTout at the downstream changing timing (t2 in FIG. 5) is represented by Qr, which represents the deterioration evaluating parameter according to the first embodiment, then DQ=Qr−Qf is used as a deterioration evaluating parameter. According to the second embodiment, as with the first embodiment, characteristic changes of the humidity sensors 23, 24 due to a deterioration thereof and characteristic variations of different individual humidity sensors 23, 24 are compensated for.

Based on the concept described above, the apparatus according to the second embodiment will be described in further detail below. According to the second embodiment, the deterioration evaluating device 21 carries out the operation sequence shown in FIG. 6 when the internal combustion engine 1 starts operating. The operation sequence corresponds to the process shown in FIG. 6 that is carried out in the first embodiment.

Figure 11:
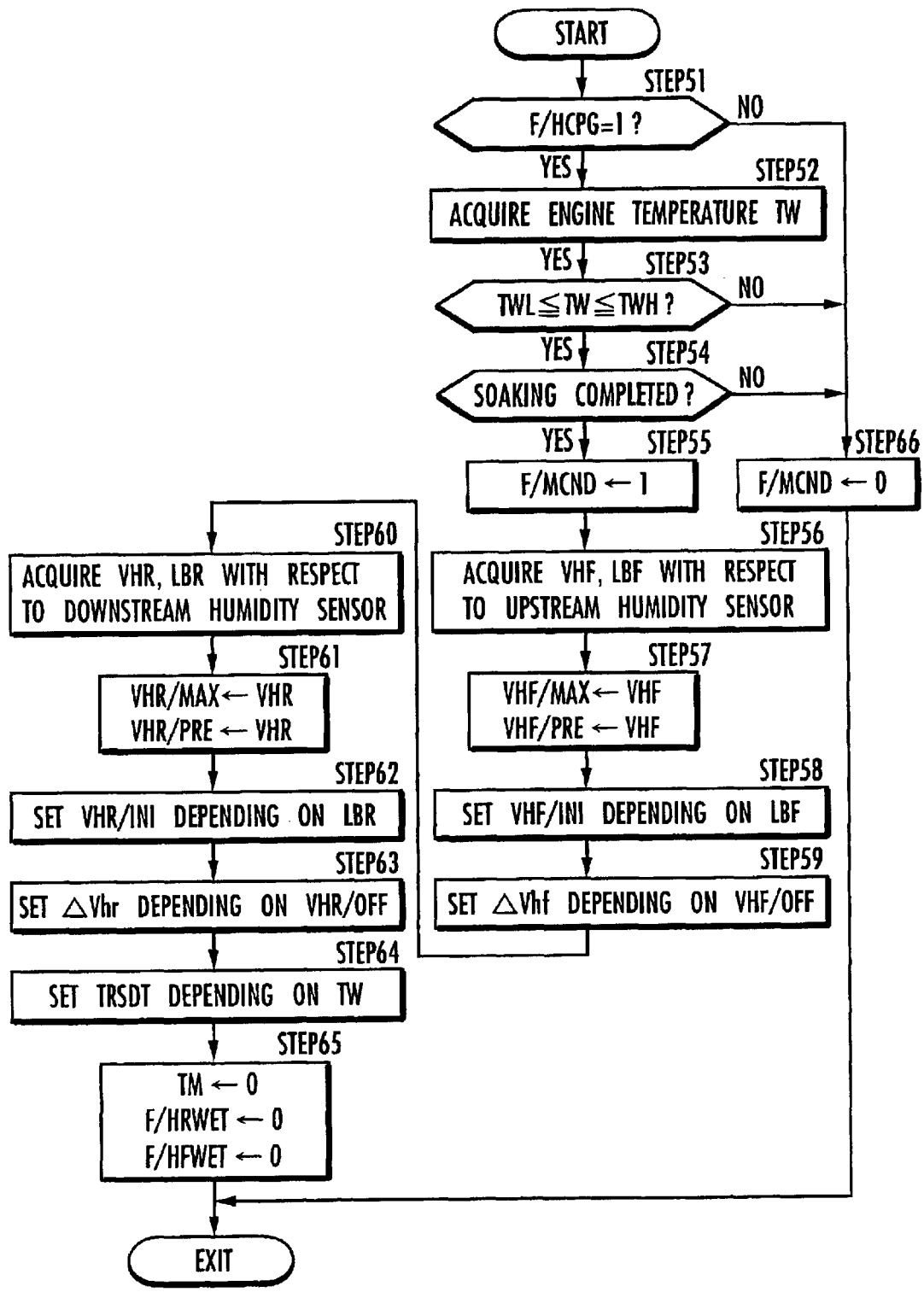
FIG. 11 is a flowchart of an operation sequence of an apparatus for evaluating the deteriorated state of a hydrocarbon adsorbent according to a second embodiment of the present invention.

In the process shown in FIG. 11, the deterioration evaluating device 21 carries out the same processing as in STEP 1 through STEP5, STEP12 shown in FIG. 6 in the first embodiment in STEP51 through STEP55, STEP66, setting the flag F/MCND. If the flag F/MCND is set to "1", indicating that the deteriorated state of the HC adsorbent 12 is to be evaluated, then the deterioration evaluating device 21 carries out the same processing as in STEP 6 through STEP9 shown in FIG. 6 with respect to the upstream humidity sensor 24 in STEP56 through STEP59. Specifically, the deterioration evaluating device 21 acquires present detected data of the output voltage VHF of the upstream humidity sensor 24 and detected data of the resistance LBF of the label resistive element 26 in STEP56. Then, the deterioration evaluating device 21 sets the present value of the output voltage VHF of the upstream humidity sensor 24 as an initial value of a maximum output parameter VHF/MAX and a preceding output parameter VHF/PRE with respect to the upstream humidity sensor 24 in STEP57. As with the first embodiment, the maximum output parameter VHF/MAX represents the latest maximum value of the output voltage VHF of the upstream humidity sensor 24, and the preceding output parameter VHF/PRE represents a preceding value of the output voltage VHF of the upstream humidity sensor 24 in each cycle time of a deterioration evaluating process to be described later on.

Then, the deterioration evaluating device 21 sets an individual sensor characteristic parameter VHF/INI with respect to the upstream humidity sensor 24 depending on the resistance LBF of the label resistive element 26 that has been acquired in STEP56 with respect to the upstream humidity sensor 24, in STEP58. The individual sensor characteristic parameter VHF/INI signifies the output voltage VHF of the upstream humidity sensor 24 when the relative humidity at the location of the upstream humidity sensor 24, i.e., upstream of the HC adsorbent 12, is a substantially constant high humidity (about 100%) after the internal combustion engine 1 has started to operate if the humidity sensor 23 is brand-new, as with the first embodiment. The individual sensor characteristic parameter VHF/INI is based on a predetermined data table in the same manner as when the individual sensor characteristic parameter VHR/INI is set with respect to the downstream humidity sensor 23 in STEP8 shown in FIG. 6. If the humidity sensors 23, 24 are of the same type, then the data table used in STEP58 may be the same as the data table according to the first embodiment.

Then, the deterioration evaluating device 21 sets a changing timing detecting preset value ΔVhf depending on a sensor deterioration parameter VHF/OFF, which is presently held, with respect to the upstream humidity sensor 24 in STEP59. The sensor deterioration parameter VHF/OFF has the same meaning as the sensor deterioration parameter VHR/OFF with respect to the downstream humidity sensor 23 described in the first embodiment. The sensor deterioration parameter VHF/OFF represents an offset of the output voltage VHF of the upstream humidity sensor 24 from the individual sensor characteristic parameter VHR/INI when the relative humidity at the location of the humidity sensor 24 upstream of the HC adsorbent 12 is a substantially constant high humidity (about 100%). The sensor deterioration parameter VHF/OFF is obtained when the internal combustion engine 1 is in operation as described later on.

The sensor deterioration parameter VHF/OFF that is used to set the changing timing detecting preset value ΔVhf in STEP59 is the latest one of values that have been determined while the internal combustion engine 1 has been operated in the past, basically while the internal combustion engine 1 has been in the preceding operation. The changing timing detecting preset value ΔVhf relative to the upstream humidity sensor 24 is set based on a data table which is similar to the data table shown in FIG. 7 according to the first embodiment. The changing timing detecting preset value ΔVhf relative to the upstream humidity sensor 24 may be set using the same data table as the data table used to set the changing timing detecting preset value ΔVhr relative to the downstream humidity sensor 23. However, the changing timing detecting preset value ΔVhf may be set based on a data table dedicated to the upstream humidity sensor 24 in view of the actual transition of the relative humidity upstream of the HC adsorbent 12. At any rate, the changing timing detecting preset value ΔVhf is set such that it is smaller as the value of the sensor deterioration parameter VHF/OFF is smaller, i.e., as the upstream humidity sensor 24 is more deteriorated.

Then, the deterioration evaluating device 21 carries out the same processing as in STEP 6 through STEP9 shown in FIG. 6 in STEP60 through STEP63, setting the parameters VHR/MAX, VHR/PRE, VHR/INI, ΔVhr with respect to the downstream humidity sensor 23.

Then, the deterioration evaluating device 21 determines a deterioration evaluating threshold TRSDT for the HC adsorbent 12 depending on the initial engine temperature TW acquired in STEP52, i.e., depending on the temperature of the HC adsorbent 12, in STEP64. The deterioration evaluating threshold TRSDT is set based on a data table (not shown) which has the same data tendency as the data table shown in FIG. 8 according to the first embodiment. According to the second embodiment, however, since the integrated amount of moisture supplied to the HC adsorbent 12 starts to be integrated from the changing timing of the output voltage VHF of the upstream humidity sensor 24, the deterioration evaluating threshold TRSDT is set to a value that is smaller than the deterioration evaluating threshold TRSDT in the first embodiment by a certain quantity.

Then, the deterioration evaluating device 21 initializes the timer TM which measures the engine operation elapsed time TM to "0", and also initializes flags F/HRWET, F/HFWET to "0" in STEP65. Thereafter, the process shown in FIG. 11 is put to an end. The flag F/HRWET is the same as the flag F/HRWET in the first embodiment. The flag F/HFWET is "1" when the output voltage VHF of the upstream humidity sensor 24 changes from a high voltage level to a low voltage level, and "0" when the output voltage VHF of the upstream humidity sensor 24 does not change from a high voltage level to a low voltage level.

Figure 12:
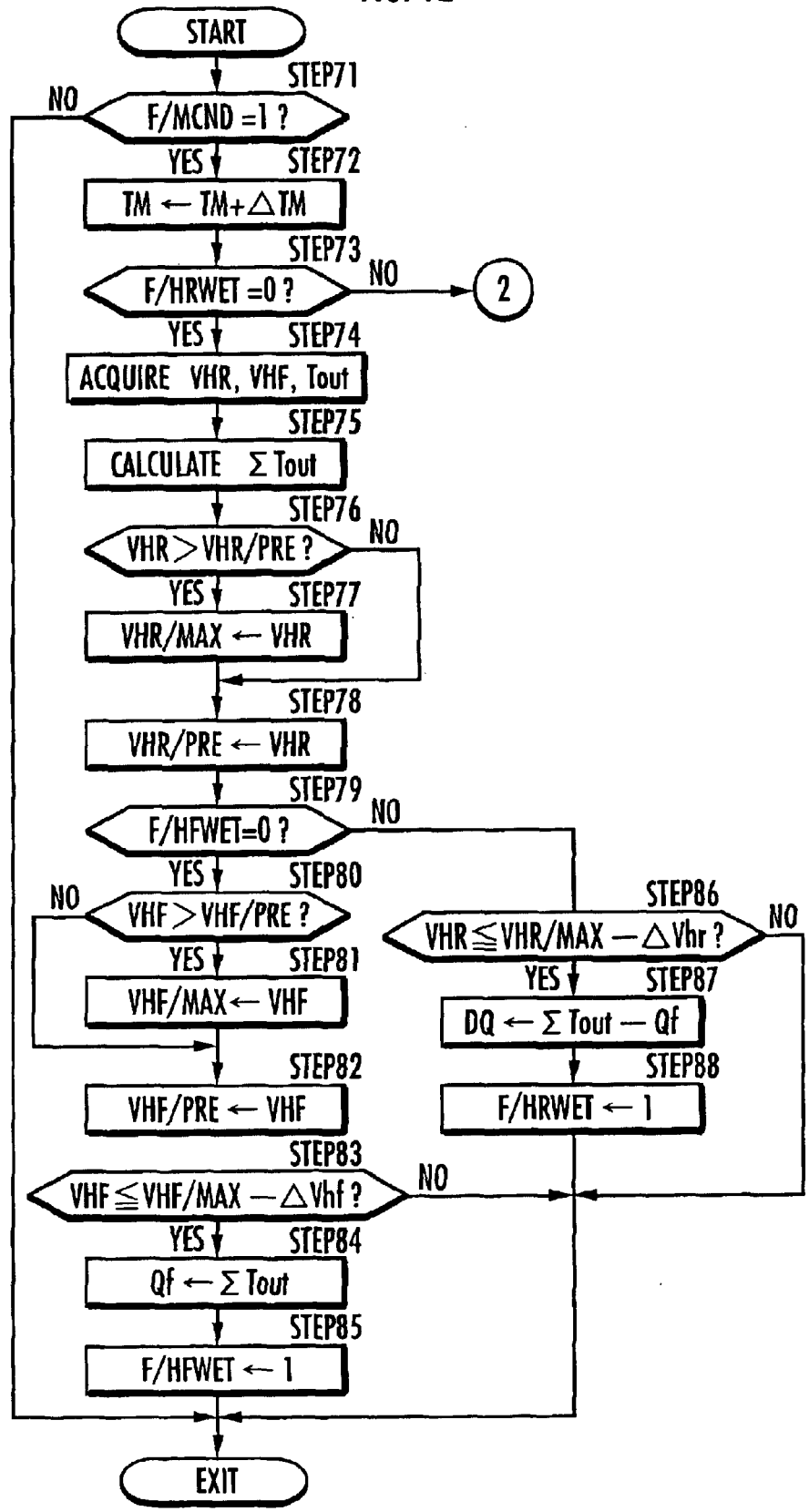
FIGS. 12 and 13 are a flowchart of another operation sequence of the apparatus according to the second embodiment of the present invention.
Figure 13:
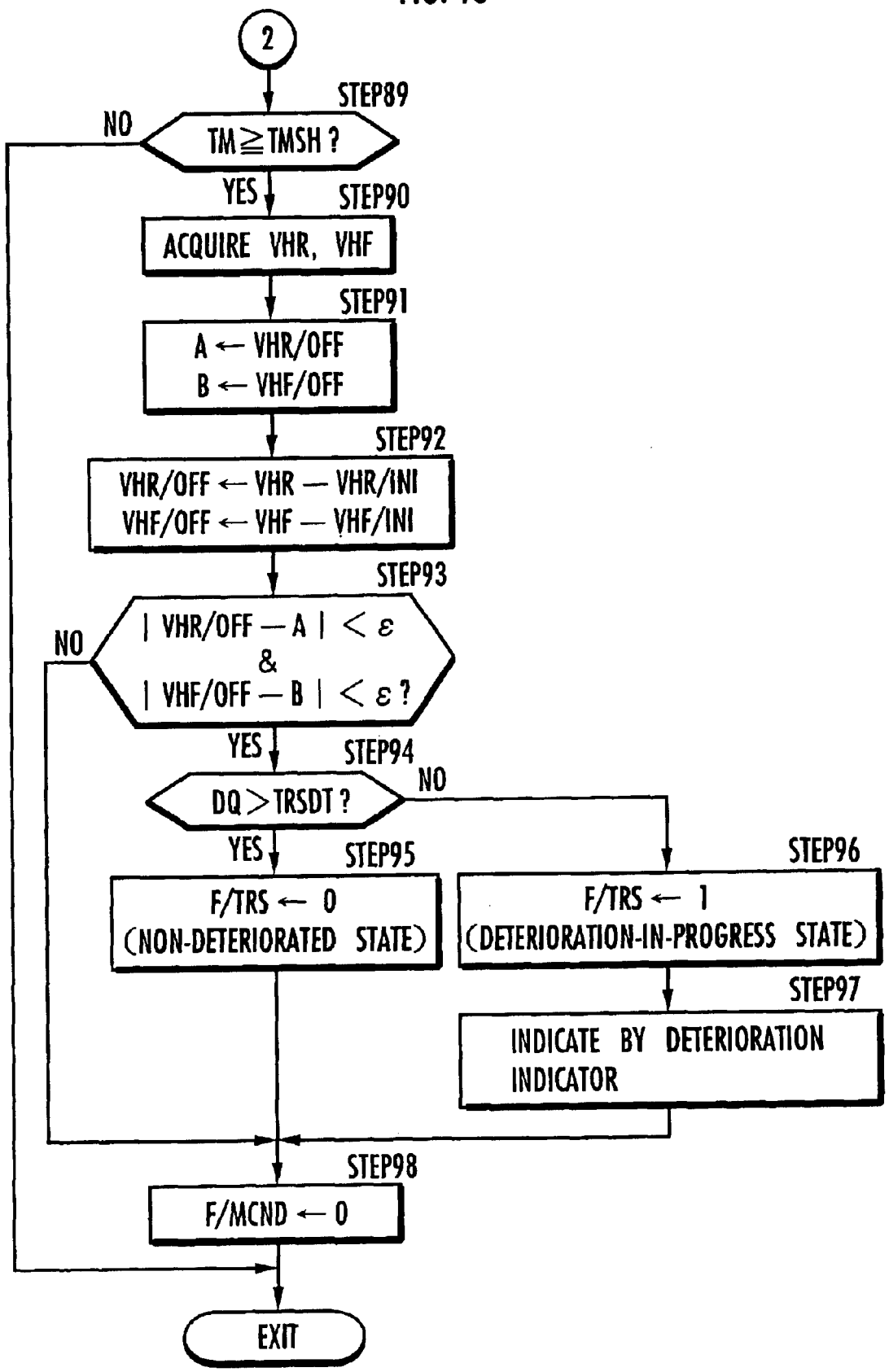

After having carried out the operation sequence shown in FIG. 11, i.e., after the internal combustion engine 1 has started to operate, the deterioration evaluating device 21 carries out an operation sequence shown in FIGS. 12 and 13 to perform a deterioration evaluating process in a given cycle time. The deterioration evaluating process corresponds to the process shown in FIGS. 9 and 10 according to the first embodiment.

In the deterioration evaluating process shown in FIGS. 12 and 13, the deterioration evaluating device 21 carries out the processing in STEP71 through STEP73 which is the same as the processing in STEP21 through STEP23 shown in FIG. 9 according to the first embodiment. If F/HRWET=0 in STEP73, i.e., if the output voltage VHR of the downstream humidity sensor 23 has not yet changed to a high voltage level, then the deterioration evaluating device 21 acquires present detected data of the output voltages VHR, VHF of the humidity sensors 23, 24, and also acquires the present fuel injection quantity command value Tout from the ECU 20 in STEP74. Then, the deterioration evaluating device 21 determines the integrated fuel injection quantity ΣTout which represents an integrated value (accumulative sum) of the fuel injection quantity command value Tout that acquired in STEP74 as integrated moisture quantity data in STEP75.

Then, the deterioration evaluating device 21 carries out the processing in STEP76 through STEP78 which is the same as the processing in STEP26 through STEP28 shown in FIG. 9 according to the first embodiment, updating the maximum output parameter VHR/MAX and the preceding output parameter VHR/PRE with respect to the downstream humidity sensor 23.

Then, the deterioration evaluating device 21 determines the value of the flag F/HFWET in STEP79. Immediately after the internal combustion engine 1 has started to operate, F/HFWET=0 because the output voltage VHF of the upstream humidity sensor 24 has not yet changed from a high voltage level to a low voltage level. In this case, the deterioration evaluating device 21 carries out the same processing as in STEP76 through STEP78 with respect to the downstream humidity sensor 23 in STEP80 through STEP82 with respect to the upstream humidity sensor 24. Specifically, the deterioration evaluating device 21 determines whether the present output voltage VHF of the upstream humidity sensor 23 acquired in STEP74 is larger than the present value of the preceding output parameter VHF/PRE in STEP80. If VHF>VHF/PRE, then the deterioration evaluating device 21 updates the value of the maximum output parameter VHF/MAX into the present value of the output voltage VHF of the upstream humidity sensor 24 in STEP81, and also updates the value of the preceding output parameter VHF/PRE into the present value of the output voltage VHF of the upstream humidity sensor 24 in STEP82. If VHF≦VHF/PRE in STEP80, then the deterioration evaluating device 21 does not update the value of the maximum output parameter VHF/MAX in STEP81, but updates the value of the preceding output parameter VHF/PRE into the present value of the output voltage VHF of the upstream humidity sensor 24 in STEP82. In the processing of STEP80–STEP82, maximum values of the output voltage VHF of the upstream humidity sensor 24, i.e., minimum values taken by the relative humidity represented by the output voltage VHF, are sequentially retrieved.

Then, the deterioration evaluating device 21 compares the present value of the output voltage VHF of the upstream humidity sensor 24 with a value (VHF/MAX−ΔVhf) which is produced by subtracting the changing timing detecting preset value ΔVhf set in the process shown in FIG. 11 from the present value of the maximum output parameter VHF/MAX (the latest value of VHF/MAX) in STEP83. If VHF>VHF/MAX−ΔVhf, i.e., if the present output voltage VHF of the upstream humidity sensor 24 is not smaller than the latest maximum output parameter VHF/MAX by ΔVhf, then the timing of the present cycle time has not yet reached the changing timing with respect to the upstream humidity sensor 24. In this case, the deterioration evaluating device 21 puts the deterioration evaluating process in the present cycle time to an end.

If VHF≦VHF/MAX−ΔVhr in STEP83, then the present output voltage VHF of the upstream humidity sensor 24 is smaller than the latest maximum output parameter VHF/MAX by ΔVhf or greater. In this case, the deterioration evaluating device 21 judges that the timing of the present cycle time (time t1 in FIG. 5) is the changing timing with respect to the upstream humidity sensor 24, and holds the present integrated fuel injection quantity ΣTout as an auxiliary parameter Qf in STEP84. Since the output voltage VHF of the upstream humidity sensor 24 has changed from a high voltage level to a low voltage level, the deterioration evaluating device 21 sets the flag F/HFWET to "1" in STEP85, and ends the deterioration evaluating process in the present cycle time.

When the flag F/HFWET is set to "1" in STEP85, the answer to STEP79 becomes NO from a next cycle time on. In this case, the deterioration evaluating device 21 compares the present value of the output voltage VHR of the downstream humidity sensor 23 with a value (VHR/MAX−ΔVhr) which is produced by subtracting the changing timing detecting preset value ΔVhr set in the process shown in FIG. 11 from the present value of the maximum output parameter VHR/MAX (the latest value of VHR/MAX) in STEP86. If VHR>VHR/MAX−ΔVhr, then the timing of the present cycle time has not yet reached the changing timing with respect to the downstream humidity sensor 23. In this case, the deterioration evaluating device 21 puts the deterioration evaluating process in the present cycle time to an end.

If VHR≦VHR/MAX−ΔVhr in STEP86, then since the timing of the present cycle time (time t2 in FIG. 5) is the changing timing, the deterioration evaluating device 21 holds a value that is produced by subtracting the value of the auxiliary parameter Qf acquired in STEP84, i.e., the integrated fuel injection quantity at the changing timing with respect to the upstream humidity sensor 24, from the present integrated fuel injection quantity ΣTout, as a deterioration evaluating parameter DQ for evaluating the deteriorated state of the HC adsorbent 12 in STEP87. In this manner, the integrated fuel injection quantity from the changing timing with respect to the upstream humidity sensor 24 to the changing timing with respect to the downstream humidity sensor 23, which represents the total amount of moisture supplied to the HC adsorbent 12 during the period between the above two changing timings, is obtained as the deterioration evaluating parameter DQ. The deterioration evaluating device 21 then sets the flag F/HRWET to "1" in STEP88, and ends the deterioration evaluating process in the present cycle time.

When the flag F/HRWET is set to "1" in STEP88, the answer to STEP73 becomes NO from a next cycle time on. The deterioration evaluating device 21 compares the present engine operation elapsed time TM with the predetermined value TMSH in STEP89, thus determining whether the output voltages VHR, VHF of the humidity sensors 23, 24 have converged to a substantially constant low voltage level, i.e., a voltage corresponding to a relative humidity of about 100%. The predetermined value TMSH may be identical to the predetermined value TMSH in the first embodiment. Alternatively, different predetermined values TMSH may be set for the respective humidity sensors 23, 24.

If the answer to STEP89 is NO, then since the output voltage VHR of the downstream humidity sensor 23 has not yet converged to the low voltage level, the deterioration evaluating device 21 finishes the deterioration evaluating process in the present cycle time. If the answer to STEP89 is YES, then the deterioration evaluating device 21 executes the same processing as in STEP33 through STEP35 according to the first embodiment in STEP90 through STEP92 with respect to the downstream humidity sensor 23. In STEP90 through STEP92, the deterioration evaluating device 21 also carries out the same process as with the downstream humidity sensor 23 on the upstream humidity sensor 24. Specifically, with respect to the upstream humidity sensor 24, the deterioration evaluating device 21 acquires the present detected data of the output voltage VHF of the upstream humidity sensor 24 in STEP90. Thereafter, the deterioration evaluating device 21 stores the present value of the sensor deterioration parameter VHF/OFF with respect to the upstream humidity sensor 24, i.e., the value of VHF/OFF that has been used to set the changing timing detecting preset value ΔVhf in the process shown in FIG. 11 at the start of the present operation of the internal combustion engine 1, as the value of a parameter B in STEP91. Then, the deterioration evaluating device 21 determines, as a new value of the sensor deterioration parameter VHF/OFF with respect to the upstream humidity sensor 24, a value that is produced by subtracting the individual sensor characteristic parameter VHF/INI with respect to the upstream humidity sensor 24 from the present value of the output voltage VHF of the upstream humidity sensor 24 acquired in STEP90, in STEP92.

Then, the deterioration evaluating device 21 determines, in STEP 93, whether the absolute value |VHR/OFF−A| of the difference between the newly determined sensor deterioration parameter VHR/OFF with respect to the downstream humidity sensor 23 and the preceding value of the sensor deterioration parameter which has previously been stored as the value of the parameter A is smaller than a predetermined value ε (sufficiently small positive value) or not, and also whether the absolute value |VHF/OFF−B| of the difference between the newly determined sensor deterioration parameter VHF/OFF with respect to the upstream humidity sensor 24 and the preceding value of the sensor deterioration parameter which has previously been stored as the value of the parameter B is smaller than the predetermined value ε or not. If |VHR/OFF−A|≧ε or |VHF/OFF−B|≧ε, then the changing timing detecting preset value ΔVhr used in STEP86 during the present operation of the internal combustion engine 1 may possibly not correspond to the present deteriorated state of the downstream humidity sensor 23 or the changing timing detecting preset value ΔVhf used in STEP83 may possibly not correspond to the present deteriorated state of the upstream humidity sensor 24. In this case, the deterioration evaluating device 21 does not essentially evaluate the deteriorated state of the HC adsorbent 12 based on the deterioration evaluating parameter DQ that has been determined in STEP87 in the present operation of the internal combustion engine 1. That is, the deterioration evaluating device 21 resets the flag F/MCND to "0" in STEP98, and ends the deterioration evaluating process in the present cycle time.

If |HR/OFF−A|<ε and |VHF/OFF−B|<ε in STEP93, then the deterioration evaluating device 21 determines whether the HC adsorbent 12 is in the non-deteriorated state or the deterioration-in-progress state, i.e., essentially evaluates the deteriorated state of the HC adsorbent 12, based on the deterioration evaluating parameter DQ that has been determined in STEP87, in STEP94 through STEP97. Specifically, the deterioration evaluating device 21 compares the value of the deterioration evaluating parameter DQ with the deterioration evaluating threshold TRSDT that is set in the process shown in FIG. 11 when the internal combustion engine 1 starts to operate in STEP94. If DQ>TRSDT, then the deterioration evaluating device 21 judges that the HC adsorbent 12 is in the non-deteriorated state and sets the flag F/TRS to "0" in STEP95. If DQ≦TRSDT, then deterioration evaluating device 21 judges that the HC adsorbent 12 is in the deterioration-in-progress state and sets the flag F/TRS to "1"

in STEP96. Then, the deterioration evaluating device 21 controls the deterioration indicator 22 to indicate that the catalytic converter 3 is in the deterioration-in-progress state in STEP97. After having thus determined the deteriorated state of the HC adsorbent 12, the deterioration evaluating device 21 resets the flag F/MCND to "0" in STEP98, and then ends the deterioration evaluating process.

According to the second embodiment, as with the first embodiment, the changing timing detecting preset value ΔVhr with respect to the downstream humidity sensor 23 is set depending on the sensor deterioration parameter VHR/OFF which represents a characteristic change of the downstream humidity sensor 23 due to a deterioration thereof. Similarly, the changing timing detecting preset value ΔVhf with respect to the upstream humidity sensor 24 is set depending on the sensor deterioration parameter VHF/OFF which represents a characteristic change of the upstream humidity sensor 24 due to a deterioration thereof. The reference value VHR/INI serving as a reference for the sensor deterioration parameter VHR/OFF with respect to the downstream humidity sensor 23 is set depending on the resistance LBR of the label resistive element 26 that represents individual characteristics of the downstream humidity sensor 23. Likewise, the reference value VHF/INI serving as a reference for the sensor deterioration parameter VHF/OFF with respect to the upstream humidity sensor 24 is set depending on the resistance LBF of the label resistive element 26 that represents individual characteristics of the upstream humidity sensor 24.

Therefore, as with the first embodiment, it is possible to adequately evaluate the deteriorated state of the HC adsorbent 12 based on the deterioration evaluating parameter DQ while compensating for characteristic changes of the humidity sensors 23, 24 due to a deterioration thereof and for characteristic variations among individual sensors 23, 24. Since characteristic changes of the humidity sensors 23, 24 and characteristic variations among individual sensors 23, 24 can be compensated for, requirements for the steadiness of the characteristics of individual sensors 23, 24 and the uniformity of the characteristics of individual sensors 23, 24 are made less stringent. Consequently, the cost required to develop the humidity sensors 23, 24 and the cost required to manufacture the humidity sensors 23, 24 are reduced.

According to the second embodiment, inasmuch as the integrated fuel injection quantity (Qr−Qf) as integrated moisture quantity data from the upstream changing timing to the downstream changing timing is used as the deterioration evaluating parameter DQ, variations of the upstream changing timing with respect to the deterioration evaluating parameter DQ can be compensated for to increase the reliability with which to evaluate the deteriorated state of the HC adsorbent 12.

In the first and second embodiments, the changing timing is detected using a change (VHR/MAX−VHR, VHF/MAX−VHF) from the latest maximum value of the output voltages of the humidity sensors 23, 24, which corresponds to the minimum value of the relative humidity, as representing a characteristic quantity of changes in the output voltages of the humidity sensors 23, 24. However, the changing timing may be detected using, in addition to the above change, a characteristic quantity of changes per given time in the output voltages of the humidity sensors 23, 24, e.g., rates of change of the output voltages of the humidity sensors 23, 24.

The first and second embodiments have been described as being applied to a system for evaluating the deteriorated state of the HC adsorbent 12 that is independently disposed in the exhaust system of the internal combustion engine 1. However, the principles of the present invention are also applicable to a system for evaluating the deteriorated state of an HC adsorbent in a hydrocarbon adsorbing catalyst which comprises a composite combination of the HC adsorbent and three-way catalyst or the like. The hydrocarbon adsorbing catalyst may comprise, for example, a carrier of honeycomb structure whose surface is coated with an HC adsorbent of zeolite and which carries a precious metal such as platinum, palladium, rhodium, or the like as a constituent material of the three-way catalyst.

Although certain preferred embodiments of the present invention have been shown and described in detail, it should be understood that various changes and modifications may be made therein without departing from the scope of the appended claims.

What is claimed is:

1. An apparatus for evaluating a deteriorated state of a hydrocarbon adsorbent disposed in an exhaust passage of an internal combustion engine for adsorbing hydrocarbons contained in an exhaust gas emitted from the internal combustion engine, based on the transition characteristics of an output signal of a humidity sensor which is disposed in the exhaust passage downstream of said hydrocarbon adsorbent after the internal combustion engine has started to operate, said apparatus comprising:

changing timing detecting means for detecting a changing timing at which a humidity represented by the output signal of the humidity sensor changes to a tendency to monotonously increase from a low humidity to a high humidity based on a comparison between a characteristic quantity of a change in the output signal of the humidity sensor and a preset value, after the internal combustion engine has started to operate;

evaluating parameter acquiring means for acquiring data representing a total amount of moisture carried by the exhaust gas to said hydrocarbon adsorbent up to said changing timing after the internal combustion engine has started to operate, as a deterioration evaluating parameter for evaluating the deteriorated state of the hydrocarbon adsorbent;

characteristic change detecting means for detecting a characteristic change of said humidity sensor based on the output signal of the humidity sensor under a predetermined condition; and characteristic change compensating means for correcting said preset value to detect said changing timing based on the characteristic change detected by said characteristic change detecting means.

2. An apparatus according to claim 1, wherein said changing timing detecting means comprises means for sequentially retrieving states in which the humidity represented by the output signal of said humidity sensor takes a minimum value, after the internal combustion engine has started to operate, and detecting said changing timing when a change in the output signal of said humidity sensor from the latest minimum value in the retrieved states to the high humidity, serving as said characteristic quantity, exceeds said preset value.

3. An apparatus according to claim 1, wherein said characteristic change detecting means comprises means for determining a change, from a predetermined reference value, of the output signal of said humidity sensor which is of a substantially constant high humidity level, as characteristic change detecting data representative of the characteristic change of said humidity sensor, after said changing timing is detected by said changing timing detecting means, and detecting the characteristic change of said humidity sensor based on said characteristic change detecting data.

4. An apparatus according to claim 1, further comprising characteristic data holding means associated with said humidity sensor, for holding, in advance, data with respect to characteristics of each individual unit of said humidity sensor, and said characteristic change detecting means comprises means for detecting the characteristic change of said humidity sensor based on the output signal of the humidity sensor under said predetermined condition and the data held by said characteristic data holding means.

5. An apparatus according to claim 3, further comprising characteristic data holding means associated with said humidity sensor, for holding, in advance, data for identifying said reference value with respect to said characteristic change detecting data as data with respect to characteristics of each individual unit of said humidity sensor, and said characteristic change detecting means comprises means for determining said characteristic change detecting data using said reference value which is identified by the data held by said characteristic data holding means.

6. An apparatus according to claim 4 or 5, wherein said characteristic data holding means comprises a resistive element having a resistance depending on the data with respect to characteristics of each individual unit of said humidity sensor.

7. An apparatus according to claim 1, wherein said evaluating parameter acquiring means comprises means for generating integrated moisture quantity data representative of sequentially integrated data of a quantity of moisture contained in said exhaust gas emitted from said internal combustion engine from the start of operation of said internal combustion engine, and means for acquiring said integrated moisture quantity data at said changing timing as said deterioration evaluating parameter.

8. An apparatus for evaluating a deteriorated state of a hydrocarbon adsorbent disposed in an exhaust passage of an internal combustion engine for adsorbing hydrocarbons contained in an exhaust gas emitted from the internal combustion engine, based on the transition characteristics of output signals of upstream and downstream humidity sensors which are disposed in the exhaust passage respectively upstream and downstream of said hydrocarbon adsorbent after the internal combustion engine has started to operate, said apparatus comprising:

upstream changing timing detecting means for detecting a changing timing at which a humidity represented by the output signal of the upstream humidity sensor changes to a tendency to monotonously increase from a low humidity to a high humidity based on a comparison between a characteristic quantity of a change in the output signal of the upstream humidity sensor and a first preset value, after the internal combustion engine has started to operate;

downstream changing timing detecting means for detecting a changing timing at which a humidity represented by the output signal of the downstream humidity sensor changes to a tendency to monotonously increase from a low humidity to a high humidity based on a comparison between a characteristic quantity of a change in the output signal of the downstream humidity sensor and a second preset value;

evaluating parameter acquiring means for acquiring data representing a total amount of moisture carried by the exhaust gas to said hydrocarbon adsorbent from said upstream changing timing to said downstream changing timing, as a deterioration evaluating parameter for evaluating the deteriorated state of the hydrocarbon adsorbent;

characteristic change detecting means for detecting a characteristic change of each of said humidity sensors based on the output signals of the humidity sensors under a predetermined condition; and characteristic change compensating means for correcting said first preset value and said second preset value based on the characteristic changes of said upstream humidity sensor and said downstream humidity sensor detected by said characteristic change detecting means.

9. An apparatus according to claim 8, wherein said upstream changing timing detecting means comprises means for sequentially retrieving states in which the humidity represented by the output signal of said upstream humidity sensor takes a minimum value, after the internal combustion engine has started to operate, and detecting said changing timing with respect to said upstream humidity sensor when a change in the output signal of said upstream humidity sensor from the latest minimum value in the retrieved states to the high humidity, serving as said characteristic quantity with respect to said upstream humidity sensor, exceeds said first preset value, and said downstream changing timing detecting means comprises means for sequentially retrieving states in which the humidity represented by the output signal of said downstream humidity sensor takes a minimum value, after the internal combustion engine has started to operate, and detecting said changing timing with respect to said downstream humidity sensor when a change in the output signal of said downstream humidity sensor from the latest minimum value in the retrieved states to the high humidity, serving as said characteristic quantity with respect to said downstream humidity sensor, exceeds said second preset value.

10. An apparatus according to claim 8, wherein said characteristic change detecting means comprises means for determining a change, from a predetermined reference value, of the output signal of said upstream humidity sensor which is of a substantially constant high humidity level, as characteristic change detecting data representative of the characteristic change of said upstream humidity sensor, after said changing timing is detected by said upstream changing timing detecting means, determining a change, from a predetermined reference value, of the output signal of said downstream humidity sensor which is of a substantially constant high humidity level, as characteristic change detecting data representative of the characteristic change of said downstream humidity sensor, after said changing timing is detected by said downstream changing timing detecting means, and detecting the characteristic change of each of said humidity sensors based on said characteristic change detecting data with respect to each of said humidity sensors.

11. An apparatus according to claim 8, further comprising characteristic data holding means associated respectively with said upstream and downstream humidity sensors, for holding, in advance, data with respect to characteristics of each individual unit of said upstream and downstream humidity sensors, and said characteristic change detecting means comprises means for detecting the characteristic changes of upstream and downstream humidity sensors based on the output signals of the upstream and downstream humidity sensors under said predetermined condition and the data held by said characteristic data holding means.

12. An apparatus according to claim 10, further comprising characteristic data holding means associated respectively with said humidity sensors, for holding, in advance, data for identifying said reference values with respect to said characteristic change detecting data with respect to the respective humidity sensors as data with respect to characteristics of each individual unit of said humidity sensors, and said characteristic change detecting means comprises means for determining said characteristic change detecting data with respect to the respective humidity sensors using said reference values which are identified by the data held by said characteristic data holding means of the respective humidity sensors.

13. An apparatus according to claim 11 or 12, wherein said characteristic data holding means comprise respective resistive elements having respective resistances depending on the data with respect to characteristics of individual units of said humidity sensors.

14. An apparatus according to claim 8, wherein said evaluating parameter acquiring means comprises means for generating integrated moisture quantity data representative of sequentially integrated data of a quantity of moisture contained in said exhaust gas emitted from said internal combustion engine from the start of operation of said internal combustion engine, and means for acquiring the difference between the integrated moisture quantity data at said changing timing with respect to said downstream humidity sensor and the integrated moisture quantity data at said changing timing with respect to said upstream humidity sensor, as said deterioration evaluating parameter.

* * * * *